US011063673B2

(12) United States Patent
Parker

(10) Patent No.: US 11,063,673 B2
(45) Date of Patent: *Jul. 13, 2021

(54) APPARATUS AND METHODS FOR EMERGENCY MINE COMMUNICATIONS USING ACOUSTIC WAVES, TIME SYNCHRONIZATION, AND DIGITAL SIGNAL PROCESSING

(71) Applicant: David H. Parker, Earlysville, VA (US)

(72) Inventor: David H. Parker, Earlysville, VA (US)

(*) Notice: Subject to any disclaimer, the term of this patent is extended or adjusted under 35 U.S.C. 154(b) by 455 days.

This patent is subject to a terminal disclaimer.

(21) Appl. No.: 15/990,822

(22) Filed: May 29, 2018

(65) Prior Publication Data
US 2018/0278342 A1 Sep. 27, 2018

Related U.S. Application Data

(63) Continuation of application No. 13/166,759, filed on Jun. 22, 2011, now Pat. No. 10,020,895.

(51) Int. Cl.
*G06Q 10/10* (2012.01)
*G06Q 40/08* (2012.01)
*G06Q 10/08* (2012.01)
*G06Q 30/02* (2012.01)
*H04B 11/00* (2006.01)
*G06Q 50/26* (2012.01)
*G06Q 30/00* (2012.01)

(52) U.S. Cl.
CPC ........... *H04B 11/00* (2013.01); *G06Q 30/018* (2013.01); *G06Q 50/265* (2013.01)

(58) Field of Classification Search
CPC ............... G06Q 10/105; G06Q 30/018; G06Q 30/0281; G06Q 50/01; G06Q 50/18; G06Q 50/265; H04B 11/00

USPC ......... 705/1.1–912, 317, 319, 320, 325, 346
See application file for complete search history.

(56) References Cited

U.S. PATENT DOCUMENTS 1,451,080 A 4/1923 Mintrop
1,599,538 A 9/1926 Mintrop
(Continued)

OTHER PUBLICATIONS

Miner Act, Mine Improvement and New Emergency Response Act of 2006, United States Public Laws 109th Congress ~ Second Session Convening Jan. 7, 2005, PL 109-236 (S 2803}, Jun. 15, 2006 (Year: 2006).*

(Continued)

*Primary Examiner* — Jonathan P Ouellette
(74) *Attorney, Agent, or Firm* — David H. Parker

(57) ABSTRACT

Apparatus and methods to implement post accident communications in a coal mine, in compliance with the MINER Act and MSHA regulations, are disclosed. Acoustic waves are transmitted bidirectionally through-the-earth in a simple robust half-duplex architecture in combination with signal-to-noise reduction techniques which ensure the ability to communicate using simple tools available in a mine. A personal electronics device, designed to be carried by each miner, automatically decodes acoustically transmitted text messages sent by rescue operations, and automatically encodes text messages by a miner to synchronized impulses manually produced by the miner. Signals are synchronized, in time of day protocol, between the miner and rescue operations. Digital signal processing techniques are disclosed.

19 Claims, 7 Drawing Sheets

(56) References Cited

U.S. PATENT DOCUMENTS

| | | | |
|---|---|---|---|
| 2,688,124 | A | 8/1954 | Doty |
| 2,808,577 | A | 10/1957 | Crawford |
| 2,874,795 | A | 2/1959 | Doty |
| 2,910,134 | A | 10/1959 | Crawford |
| 2,989,726 | A | 6/1961 | Crawford |
| 3,209,322 | A | 9/1965 | Doty |
| 3,273,112 | A | 9/1966 | Hobson |
| 3,715,664 | A | 2/1973 | Ikrath |
| 3,949,353 | A | 4/1976 | Waters |
| 4,066,992 | A | 1/1978 | Buller |
| 4,486,866 | A | 12/1984 | Muir |
| 4,777,652 | A | 10/1988 | Stolarczyk |
| 4,866,680 | A | 9/1989 | Scherbatskoy |
| 5,850,369 | A | 12/1998 | Rorden |
| 6,002,640 | A | 12/1999 | Harmon |
| 6,308,137 | B1 | 10/2001 | Underhill |
| 6,400,646 | B1 | 6/2002 | Shah |
| 6,488,117 | B1 | 12/2002 | Owen |
| 6,530,263 | B1 | 3/2003 | Chana |
| 6,584,406 | B1 | 6/2003 | Harmon |
| 6,885,918 | B2 | 4/2005 | Harmon |
| 6,928,030 | B2 | 8/2005 | Chamberlain |
| 6,942,034 | B2 | 9/2005 | Harmon |
| 7,307,915 | B2 | 12/2007 | Kimball |
| 7,551,516 | B2 | 6/2009 | Harmon |
| 7,710,822 | B2 | 5/2010 | Harmon |
| 7,843,768 | B2 | 11/2010 | Squire |
| 7,929,380 | B2 | 4/2011 | Wei |
| 8,031,555 | B2 | 10/2011 | Schuster |
| 8,100,479 | B2 | 1/2012 | Bis |
| 8,115,622 | B2 | 2/2012 | Stolarczyk |
| 8,116,994 | B2 | 2/2012 | Parker |
| 8,294,568 | B2 | 10/2012 | Barrett |
| 8,326,569 | B2 | 12/2012 | Lee |
| 8,351,979 | B2 | 1/2013 | Seguin |
| 8,374,055 | B2 | 2/2013 | Yang |
| 8,442,797 | B2 | 5/2013 | Kim |
| 8,542,114 | B2 | 9/2013 | Stolarczyk |
| 8,577,298 | B2 | 11/2013 | Parks |
| 8,611,187 | B2 | 12/2013 | Bis |
| 8,885,559 | B2 | 11/2014 | Schmidt |
| 9,118,409 | B2 | 8/2015 | Bertosh |
| 9,179,475 | B2 | 11/2015 | Koleszar |
| 9,258,722 | B2 | 2/2016 | Schmidt |
| 9,348,050 | B2 | 5/2016 | Krohn |
| 9,432,130 | B2 | 8/2016 | Zlotnick |
| 9,537,583 | B2 | 1/2017 | Bertosh |
| 9,608,848 | B2 | 3/2017 | Roy |
| 9,760,853 | B2 | 9/2017 | Rose |
| 10,020,895 | B2 | 7/2018 | Parker |
| 2005/0197781 | A1 | 9/2005 | Harmon |
| 2006/0148514 | A1 | 7/2006 | Reagor |
| 2009/0316530 | A1 | 12/2009 | Bunyard |
| 2010/0311325 | A1 | 12/2010 | Marshall |
| 2011/0310701 | A1 | 12/2011 | Schuster |
| 2014/0167972 | A1 | 6/2014 | Koste |

OTHER PUBLICATIONS

Easysurf:Time Duration Calculator, www.easysurf.cc/tspan.htm, Retrieved from webarchive.org, Sep. 22, 2010 (Year: 2010).*
Internal Review of MSHA's Actions at the Sago Mine, Wolf Run Mining Company, Sago, Upshur County, West Virginia, MSHA 2007, pp. 122-124.
Postdisaster Survival and Rescue Research, Proceedings: Bureau of Mines Technology Transfer Seminar, Pittsburgh, Pa, Nov. 16, 1982, Information Circular 8907, pp. 50-65.
Seismic Detection of Trapped Miners Using In-Mine Geophones, Bureau of Mines Report of Investigations 8158, 1976.
Harris, Draft Summary of First Workshop on Trapped Miner Location using Siesmic Listening Devices, recovered from the internet Oct. 19, 2017, http://www.wvminesafety.org/PDFs/Seismic/Draft%20Report%20of%20WV%20Seismic%20Loaction%20Workshop.pdf.
Heasley, Seismic Field Test Preliminary Report, Sep. 30, 2006, recovered from the internet Oct. 19, 2017, http://www.wvminesafety.org/PDFs/Seismic/Seisimic%20Field%20Test%20Report.pdf.
Heasley, Update on the WV Miner Location Seismic System, Jun. 28, 2006, recovered from the internet Oct. 19, 2017, http://www.wvminesafety.org/PDFs/Seismic/Update%201%20WV%20Miner%20Seismic%20System.pdf.
Luo, Development and Field Testing of a Seismic System for Locating Trapped Miners—Progress Report, recovered from the internet Oct. 19, 2017, http://www.wvminesafety.org/PDFs/Seismic/Update%202%20WV%20Miner%20Seismic%20System.pdf.
Heasley, Development of a Seismic System for Locating Trapped Miners, Final Technical Report, Sep. 9, 2011-Apr. 8, 2013.
Mining Contract: Development of a Seismic System for Locating Trapped Miners, CDC contract 200-2011-39885 Sep. 1, 2011-Apr. 8, 2013, recovered from the internet Oct. 19, 2017, https://www.cdc.gov/niosh/mining/researchprogram/contracts/contract_200-2011-39885.html.
Adebisi, Calculating the Surface Seismic Signal from a Trapped Miner, Thesis submitted to the College of Engineering and Mineral Resources at West Virginia University, 2012.
Yenchek, NIOSH-Sponsored Research in Through-the-Earth Communications for Mines: A Status Report, IEEE Transactions on Industrial Applications vol. 48 issue Sep. 5-Oct. 2012.
New Device Could Seek & Save Trapped Miners, Coal Age Nov. 2011.
Mine Safety and Health Administration, Program Policy Letter No. P14-V-01, Mar. 27, 2014.
Mine Safety and Health Administration, Program Policy Letter No. P16-V-01, Apr. 21, 2016.
Durkin et al., Evaluation of the Seismic System for Locating Trapped Miners, Bureau of Mines Information Circular 8567, 1981.
Pratt, Finding Trapped Miners by Using a Prototype Seismic Recording System made from Music-Recording Hardware, U.S. Geological Survey Open-File Report 2009-1095.
Pratt, Finding Trapped Miners by Using a Prototype Seismic Recording System made from Music-Recording Hardware, executive summary.
COMBIPHON product literature, Hermann Sewerin GmbH, recovered on the internet May 21, 2018, https://www.sewerin.com/cms/fileadmin/redakteure/Prospekte/pro_combiphon_en.pdf.
Morton, New Wireless Tech for Underground Mines Could Save Lives, Costs, Coal Age, Apr. 2018.
Coal Mine Rescue and Survival System, Final Report, Bureau of Mines Contract H0101262, 1971.
Mine Rescue and Survival, Final Report, Committee on Mine Rescue and Survival Techniques, National Academy of Engineers, 1970.
Telford et al., Applied Geophysics, Cambridge University Press, 1976, p. 240-242.
Dobrin, Introduction to Geophysical Prospecting, McGraw-Hill, 1976, p. 10-11, p. 39, p. 46-49.
Burger et al., Introduction to Applied Geophysics, W. W. Norton, 1992, p. 7-61.
Kearey et al., An Introduction to Geophysical Exploration, Blackwell Scientific Publications, 1984, p. 26-27.
Serra, Fundamentals of Well-Log Interpretation, Elsevier, 1984, p. 225.
Serra, Well Logging and Reservoir Evaluation, Editions Technip, 2007, p. 4-5.
Anstey, Vibroseis, Prentice Hall, 1991, copyright information.
Laliberte, Summary Study of Underground Communications Technologies, CANMET Mining and Mineral Sciences Laboratories, 2009, p. 1-113.
United States Public Laws, PL 109-236 (S2803), 2006, p. 1-13.
Mine Safety and Health Administration, Program Policy Letter No. P09-V-01, 2009, p. 1-6.
Mine Safety and Health Administration, Program Policy Letter No. P11-V-13, 2011, p. 1-5.
Underground Mine Communications, Control and Monitoring, Section 2.6.1 Seismic Systems, Bureau of Mines Information Circular 8955, US Department of Interior, 1984.

(56) References Cited

OTHER PUBLICATIONS

Heasley, Seismic Field Test SureWave Technology at Federal #2 Mine, Feb. 23, 2011, recovered on the internet Jul. 18, 2013, www.surewavetechnology.com/Images/Report.pdf.
Finding Trapped Miners, U News Center, The University of Utah, Mar. 26, 2009.
Sullivan et al., To the Rescue, World Coal, Dec. 2010.
Squire et al., Proof-of-concept testing of a deep seismic communication device, Society for Mining, Metallurgy, and Exploration, vol. 326, 2009, p. 97-100.

* cited by examiner

APPARATUS AND METHODS FOR EMERGENCY MINE COMMUNICATIONS USING ACOUSTIC WAVES, TIME SYNCHRONIZATION, AND DIGITAL SIGNAL PROCESSING

CROSS-REFERENCE TO RELATED APPLICATIONS

This application is a continuation-in-part of U.S. patent application Ser. No. 13/166,759 filed Jun. 22, 2011, the benefits of which are claimed and which is incorporated by reference herein.

FIELD OF INVENTION

The invention disclosed herein is most closely allied with art found in USPC classes 367, 340, and 702. The invention utilizes acoustic waves through-the-earth to establish emergency communications in an underground mine. The signal-to-noise (S/N) is greatly improved by establishing a procedure to synchronize the time window of communications, encoding of data, and by utilizing digital signal processing techniques to exploit a priori knowledge of the time window and data encoding.

BACKGROUND OF THE INVENTION

Emergency communications between miners and rescuers remains a significant problem. While there are well established systems for normal communications within a mine and between the miners and above ground, in most emergencies the infrastructure can be damaged—leaving miners at a loss for communications. Recent mine emergencies, legislation, regulations, and prior art illustrate the state-of-the-art.

Notable Mine Emergencies

Quecreek

At approximately 9 PM on Jul. 24, 2002 an abandoned mine was accidentally breached by miners in the Quecreek mine, located in Somerset County, Pa. According to a story in Wikipedia, 9 miners were cut off from the mine entrance by water that flooded the mine. All communications with the miners was lost shortly after the accident. Water quickly flooded the mine, and by 9:15 AM on July 25, water was exiting the portals. Rescuers decided that if the miners were alive, the best guess was to drill a hole into one of the higher locations of the mine, in hopes that the miners had found an air pocket at a high point. The location was approximately 3000 feet from the entrance shaft and under 240 feet of earth.

According to a Jan. 24, 2003 article by John Stenmark in *Point of Beginning* (a surveying trade magazine) titled Saved by Surveying, Satellite and skill; engineering technician Bob Long, established the location of the desired drilling point by 1:25 AM July 25, after only 90 minutes on site. This rapid and accurate location was made possible by modern surveying methods—including GPS. Based on the location surveyed by Long, a 6.5 inch borehole was started at 2:05 AM and broke through into the mine at 5:06 AM. Rescue workers tapped on the shaft and received 3 strong bangs in response.

With confirmation that there were survivors, air was pumped in to create a higher pressure in the space to push the rising water out. Despite the attempt to pressurize the space, the water continued to rise and water covered the airshaft—which prevented the miners from signaling by tapping on the airshaft. By noon, the miners were about 300 feet from the airshaft. They resorted to banging on the rock ceiling with a hammer, which was detected by seismic equipment brought in by Federal mining officials.

A 30 inch hole was begun at 6:45 PM on July 25. After breaking a drill bit, a 26 inch bit broke through at 10:16 PM on July 27. Rescuers signaled to the miners by tapping on the drill shaft with a hammer, and a faint response was heard. All 9 miners were removed from the mine by 2:45 AM on July 28. All of the miners suffered from the cold wet conditions, with body temperatures between 92.5 and 96.8.

Ironically, the root cause of the Quecreek mine disaster was an undated and uncertified map of the abandoned mine, which was abandoned in 1963. One of the factors that made it possible to locate the drilling locations for the mine in which the miners were trapped was modern surveying techniques and GPS. The Quecreek disaster is the first known case of using GPS equipment to quickly and accurately locate a rescue point from above ground. Engineering technician Long earned a degree of notoriety for his work, but the Quecreek mine disaster brought attention to the mine operators that accurate mine surveys tied to GPS coordinates could be very useful in an emergency situation. It is now accepted that locations in a mine can accurately, and rapidly, be projected to above ground coordinates.

Sago

At 6:30 AM on Jan. 2, 2006 there was an explosion in the Sago Mine in Sago, W. Va. According to a story in Wikipedia; thirteen miners were trapped about 2 miles from the entrance to the mine and under about 280 feet of earth. Fumes and heavy smoke between the miners and the entrance prevented escape or entry by a rescue team. All communications were severed, so two 6.25 inch holes were drilled into the area considered to be the most likely shelter for the miners. The first hole was completed the morning of January 3, but no signs of life were detected. When conditions cleared, a rescue team made its way in through the entrance in the early morning of January 4, and found one survivor, Randal McCloy Jr., in critical condition. The other 12 miners had died from carbon monoxide poisoning. McCloy was removed at approximately 1:30 AM and treated for carbon monoxide poisoning, a collapsed lung, brain hemorrhaging, edema, muscle injury, faulty liver and heart function. Recovery required months of treatment and rehabilitation.

McCloy later recounted the story in an article in the Charleston Gazette on Apr. 28, 2006. He stated they;

attempted to signal our location to the surface by beating on mine bolts and plates. We found a sledgehammer, and for a long time we took turns pounding away. We had to take off the rescuers in order to hammer as hard as we could. This effort caused us to breathe much harder. We never heard a responsive blast or shot from the surface.

The futile attempts to signal their location had gone undetected topside. Had the rescue team known for sure that there were survivors, and the approximate location, perhaps a larger shaft could have been drilled in time to rescue more of the miners or McCloy could have been rescued earlier and spared some of his injuries.

Crandall Canyon

At 2:48 AM on Aug. 6, 2007 there was a mine collapse at Crandall Canyon Mine in Emery County, Utah. According to a story in Wikipedia; six miners were believed to be approximately 3.4 miles from the mine entrance and 1500 feet underground. All communications were severed, so a series of six holes were drilled in the most likely locations for survivors to shelter. The first was a 2.5 inch hole that broke through at 9:47 PM on August 9. The sixth was completed on August 23. No life was detected through any of the holes.

On August 16, a second collapse killed three rescue workers and injured six others. After the sixth hole was completed with negative results, the rescue was terminated and the bodies of the miners were never recovered.

Had there been better communications, and survivors, perhaps the first hole could have been drilled in the actual location. Had there been no survivors, and high probability that the absence of communications indicated no survivors, the rescue team would not have been put in as much danger. Perhaps the loss of life and injury suffered by the rescuers could have been avoided.

San José

On Aug. 5, 2010, there was a cave-in at the San Jose mine in the Atacama Desert near Copiapó, Chile. According to a story in Wikipedia; 33 miners were trapped approximately 3 miles from the entrance and 2,300 feet below ground. There was a second collapse on August 7, which halted attempts to rescue the miners through the existing mine shafts. All communications were severed, so holes were drilled in the most likely locations for the miners to shelter.

The first broke through on August 19, but no signs of life were detected. The eighth hole broke through on August 22. The eighth drill located the miners after 17 days. All 33 miners were rescued on Oct. 13, 2010.

Had there been better communications, perhaps the eighth hole location could have been drilled first, and the miners could have been spared 17 days of uncertainty as to whether or not they were going to be rescued.

US Mine Safety Legislation and Regulations

In the United States, mine safety is governed by the Federal Mine Safety and Health Act of 1977. This legislation created the Mine Safety and Health Administration (MSHA) under the Secretary of Labor. As will be explained in more detail hereinbelow, the National Institute for Occupational Safety and Health (NIOSH) is administered under the Secretary of Health and Human Services and is also responsible for aspects of mine safety.

Following the Sago Mine accident, The Federal Mine Safety and Health Act of 1977 was amended by the Mine Improvement and New Emergency Response Act of 2006, or the "MINER Act". Under the amendment PL 109-236 (S 2803) Jun. 15, 2006; Title 30 of the United States Code, 30 U.S.C., which is administered by the MSHA, was amended to add POST-ACCIDENT COMMUNICATIONS under 30 U.S.C. 876(b)(2)(E)(i), which states;

(i) POST-ACCIDENT COMMUNICATIONS—The plan shall provide for redundant means of communication with the surface for persons underground, such as secondary telephone or equivalent two-way communication.

The act also added 30 U.S.C. 876(b)(2)(F)(ii);

(ii) POST ACCIDENT COMMUNICATIONS—Not later than 3 years after the date of enactment on the Mine Improvement and New Emergency Response Act of 2006, a plan shall, to be approved, provide for post accident communications between underground and surface personnel via wireless two-way medium, and provide for an electronic tracking system permitting surface personnel to determine the location of any persons trapped underground or set forth within the plan the reasons such provisions can not be adopted, the plan shall also set forth the operator's alternative means of compliance. Such alternative shall approximate, as closely as possible, the degree of function utility and safety protection provided by wireless two-way medium and tracking system referred to in this subpart.

The act also added 29 U.S.C. 671(h), which is administered by NIOSH (the Institute), to create the Office of Mine Safety and Health;

(h) OFFICE OF MINE SAFETY AND HEALTH—
  (1) IN GENERAL—There shall be permanently established under the Institute an Office of Mine Safety and Health which shall be administered by an Assistant Director to be appointed by the Director.
  (2) PURPOSE—The purpose of the Office is to enhance the development of new mine safety technology and technological applications and to expedite the commercial availability and implementation of such technology in mining environments.
  (3) FUNCTIONS—In addition to all purposes and authorities provided for under this section, the Office of Mine Safety and Health shall be responsible for research, development, and testing of new technologies and equipment designed to enhance mine safety and health. To carry out such functions of the Institute, acting through the Office, shall have authority to— . . . .

Under 29 U.S.C. 671(h), the Office of Mine Safety and Health (under NIOSH and the Secretary of Health and Human Services), is providing technology assistance to MSHA (under the Secretary of Labor), to implement the MINER Act mandate for POST ACCIDENT COMMUNICATIONS under 30 U.S.C. 876(b)(2)(F)(ii).

The NIOSH web site publishes updates on projects and activities under its MINER ACT of 2006 page. A report of Projects and Activities, updated Jan. 10, 2011, list 20 Contracts and Grants awarded for emergency communications. For example:

The National Institute of Standards and Technology has a contract to develop modeling and simulation tools to evaluate the performance of underground mine communications networks.

Helium Networks has a contract to design and develop a tool for mapping wireless coverage in underground coal mines.

Foster-Miller, Inc. has a contract to develop guidelines for safe management of electrical equipment and systems during a mine emergency or other abnormal circumstance.

CSIRO has a contract to evaluate the feasibility of a fiber optic sprinkler head emergency communications system for use in underground mines.

Pillar Innovations LLC has a contract to investigate techniques to increase the survivability of leaky feeder communications systems.

Rajant Corp. has a contract to develop a media converter device to interface wireless handheld radios with leaky feeder communication systems.

Ultra Electronics Canada Defense, Inc. has a contract to fabricate and test through-the-earth communication devices in an underground mine.

DISA Joint Spectrum Center has a contract to develop guidelines for safe and efficient use of the limited radio spectrum in underground mines.

CERMUSA has a contract to test efficacy of deploying a vehicular satellite communication system for use during mine rescue and other emergency events.

CONSPEC Controls, Inc. has a contract to develop a robust intrinsically safe system that will incorporate atmospheric monitoring, two-way communications and miner tracking, all in a single network.

URS Group, Inc. has a contract to determine appropriate and practical risk analysis techniques for assessing and mitigating basic types of possible stored energy sources.

Foster-Miller, Inc. has a contract to develop recommendations for battery selection, use, and charging in underground coal mines.

U.S. Army CERDEC has a contract to adapt a subterranean wireless communications system for use in underground mines.

Foundation Telecom, Inc. has a contract to develop a universal signal evaluation package for 75 and 150 MHz bands, adapt a passive magnetic amplifier for 900 MHz, and investigate energy harvesting technologies.

Foster-Miller, Inc. has a contract to develop a method to evaluate the reliability and survivability of underground communication, tracking, and atmospheric monitoring systems.

Alertek, LLC has a contract to develop a battery-powered, through-the-earth wireless voice communication system for overburdens of up to 600 feet.

Lockheed Martin Corp. has a contract to develop and demonstrate a two-way, through-the-earth communication system for mines.

Stolar Research, Inc. has a contract to design, fabricate, and test a prototype, two-way, through-the-earth emergency communication system.

E-Spectrum Technologies has a contract to adapt an existing ULF through-the-earth system for communication and tracking of underground miners.

L-3 Global Security & Engineering Solutions has a contract to design, install, and evaluate a wireless mesh communication and tracking network in an underground coal mine.

An article published in IEEE Transactions on Industry Applications (Volume 48, Issue 5, September-October 2012) by Yenchek et al., *NIOSH-Sponsored Research in Through-the-Earth Communications for Mines: A Status Report*, which is incorporated by reference herein, describes five systems funded by NIOSH.

An excellent review of the state-of-the-art was published by CANMET Mining and Mineral Sciences Lab (MMSL), which is an agency of Natural Resources Canada. Report CANMET-MMSL 09-004(TR), *Summary Study of Underground Communications Technologies*, May 2009, is incorporated by reference herein. The 113 page report covers inter alia; Very Low Frequency Through-the-earth Communications, MF or Medium Frequency Communications, VHF Leaky Feeder Communications, UHF Leaky Feeder Communications, Distributed Antenna Systems, Wi-Fi Communications, Mesh Networks, and Ultra Wide Band (UWB) Communications.

Despite the mandate by Congress to prove a plan for Post-Accident Communications by Jun. 15, 2009, the technology has not been successfully demonstrated. MSHA PROGRAM POLICY LETTER NO. P09-V-01, dated Jan. 16, 2009, on the SUBJECT: Guidance for Compliance with Post-Accident Two-Way Communications and Electronic Tracking Requirements of the Mine Improvement and New Emergency Response Act (MINER Act), which is incorporated by reference herein, states;

However, because fully wireless communications technology is not sufficiently developed at this time, nor is it likely to be technologically feasible by Jun. 15, 2009, this guidance addresses acceptable alternatives to fully wireless communication systems.

The expiration date of P09-V-01 was Mar. 31, 2011.

MSHA PROGRAM POLICY LETTER NO. P11-V-13, dated Apr. 28, 2011, on the SUBJECT: Guidance for Compliance with Post-Accident Two-Way Communications and Electronic Tracking Requirements of the Mine Improvement and New Emergency Response Act (MINER Act), which is incorporated by reference herein, updated P09-V-01 and states;

However, because fully wireless communications technology is not sufficiently developed at this time to permit use throughout the industry, this guidance addresses acceptable alternatives to fully wireless communication systems. New ERPs [Emergency Response Plans] and revisions to existing ERPs should provide for alternatives to fully wireless communication systems.

The expiration date of P11-V-13 is Mar. 31, 2013.

MSHA PROGRAM POLICY LETTER NO. P14-V-01, dated Mar. 27, 2014, on the same SUBJECT, which is incorporated by reference herein, updated P11-V-13 and states, under the Policy section;

Because fully wireless communication technology is not sufficiently developed at this time to permit use throughout the industry, this guidance addresses acceptable alternatives. ERPs must provide alternatives to fully wireless communication systems until these systems become available for use throughout the industry.

MSHA PROGRAM POLICY LETTER NO. P16-V-01, dated Apr. 21, 2016, on the SUBJECT: Implementation of Section 2 of the Mine Improvement and New Emergency Response Act of 2006, which is incorporated by reference herein, refers back to PPL P14-V-01, under the section Post-accident Communication. In other words, as of 2016, the technology mandated by congress to be provided by 2009 was still not sufficiently developed to permit use throughout the industry.

There is clearly a long felt but unresolved need for post-accident communication.

Acoustic Communications

It will be understood that the terms acoustic, seismic, or sound, as used herein, will include all mechanical vibrations and is not limited to the human aural sensitivity frequency of 20-20,000 Hz. For example, seismic vibrations which may be referred to as acoustic or sound may extend to fractions of 1 Hz. A review of the NIOSH Contracts and Grants, and the CANMET-MMSL report reveals a conspicuous absence of research and products using acoustic communications through-the-earth. In fact, there are no contracts for acoustic communications listed, and there is no mention of the technology in the CANMET-MMSL report. Yet in the accident reports listed hereinabove, the most basic and simplest communication was transmitted acoustically.

PRIOR ART

The prior art discloses a number of ideas that have been proposed for seismic communications.

U.S. Pat. No. 3,273,112 to Hobson, incorporated by reference herein, discloses a tuned seismic wave communication system for military communications which is invulnerable to nuclear attack and difficult to jam. Hobson discloses a variety of seismic transmitters and receivers, as well as techniques for coupling to a rock strata—such as using a closed end well casing filled with water to connect the surface with an underground rock strata. Hobson also discloses encoding schemes such as Morse code by switching a fixed frequency vibration on and off, and frequency modulation.

U.S. Pat. No. 3,715,664 to Ikrath, incorporated by reference herein, discloses a method of repeating RF-borne signal across an earth barrier, in which in one embodiment a seismic-acoustic transmitter is used to transmit a signal through a mountain to a receiver on the other side under military conditions, e.g., conditions that would not be conducive to setting up a radio tower on top of the mountain. The preferred band is between 70 and 100 Hz, with 78-83 Hz for soft earth and around 80 Hz for hard rock. For soft earth, 10 Watt transducers are recommended and for hard rock around 60 Watts is preferred. Results are cited for successful communication in a mine from the surface through 1600 feet vertically, and greater than 0.5 miles across hilly terrain.

U.S. Pat. No. 3,949,353 to Waters et al., incorporated by reference herein, discloses a system for continually monitoring, processing, and classifying seismic measurements of an underground mine. One objective is to pin-point the location of underground areas where men may be trapped after a cave-in.

U.S. Pat. No. 4,066,992 to Buller et al., incorporated by reference herein, discloses a seismic surveillance system with automatic gain control (AGC) circuitry for each underground geophone sensor. The AGC amplifiers "keep the ambient noise level constant while allowing impulsive seismic events to be passed in their true form".

U.S. Pat. No. 7,307,915 to Kimball, incorporated by reference herein, discloses a seismic modem for the transmission of data. Problems of transmission through an inhomogeneous medium, reflections, refraction, dispersion, and other sources of waveform distortion are addressed by preceding communications by a training sequence of waves which are used to estimate transmission parameters. These parameters are then applied to the communications signals to improve the signal-to-noise ratio and extract the signals from background noise. One preferred embodiment uses a transducer built into footwear, and uses the weight of the wearer to improve coupling of the transducer to the ground.

U.S. Pat. No. 7,843,768 to Squire et al., incorporated by reference herein, discloses a system for communicating location of survivors in mine emergencies by transmitting seismic waves of pre-selected frequencies. The signal-to-noise ratio is improved by preferably using frequencies between 40 and 85 Hz to minimize attenuation, using between 100 and 1000 Watts to drive a transducer, using a high Q bandpass filter at the receiver, and using Fourier filtering to extract the pre-selected frequencies.

U.S. Pat. No. 8,031,555 to Schuster, incorporated by reference herein, discloses a seismic location and communication system which uses a library of pre-recorded reference signals produced by underground seismic generators detected by an array of detectors. In an emergency, the signal from a seismic generator is cross-correlated with the library of pre-recorded reference signals to detect the signal, which identifies the signature of the seismic generator and thus the location. The seismic generators are permanently installed in a mine at selected locations, and may be activated by manually striking with a hammer. The signal-to-noise ratio is greatly improved by the array of receivers and cross-correlation operation, which allows the signals to be extracted from the background noise. Messages may be transmitted by coding the signal generation using coding techniques such as Morse code.

US 2009/0316530 to Bunyard et al., incorporated by reference herein, discloses a bi-directional seismic communication system in which seismic communication stations are established at safety shelters in a mine. Metal rods are anchored into the rock to enhance seismic coupling to transducers or manually striking with a hammer. Various encoding schemes are disclosed including encoding schemes for Morse code and tokens to optimize efficiency. Experimental results are shown for various signal sources detected at 1508 feet including a sledgehammer showing a signal-to-noise ratio of 35.9 dB.

U.S. Pat. No. 8,100,479 to Bis et al., incorporated by reference herein, discloses a miner acoustic communication and locating system in which a pneumatically driven mechanical piston device automatically generates a continuous acoustic wave to signal the location of trapped miners. The device is powered by solid propellant gas generators, similar to those used to inflate automobile airbags. An array of detectors above ground is used to triangulate the location of the source.

U.S. Pat. No. 8,374,055 to Yang et al., incorporated by reference herein, discloses acoustic communication and locating devices for underground mines in which miners communicate above ground using battery powered portable miner signal units to transmit modulated acoustic signals to a base station above ground. The base station has an array of transceivers to receive and transmit signals from/to the miners. The miner signal units include an impact actuator, a control system, and a user interface. The miner enters a message via the user interface which is then encoded by the control system to produce modulated seismic signals which are received by the base station via the array of transceivers. A library of baseline signals, which are updated periodically prior to an emergency, are used to correlate with the received signal to improve the signal-to-noise ratio, triangulate the location of the signal source, and resolve simultaneous miner signal unit signals.

U.S. Pat. No. 9,118,409 and divisional U.S. Pat. No. 9,537,583 to Bertosh et al., incorporated by reference herein, discloses a system wherein an underground controller communicates above ground using the apparatus disclosed in U.S. Pat. No. 7,843,768, cited hereinabove, for communication to the surface, and magnetic induction for communication from the surface to the underground controller.

Turning now to research sponsored by MSHA. Bureau of Mines Information Circular 8158, *Seismic Detection of Trapped Miners Using In-Mine Geophones* (1976), which is incorporated by reference herein, documents experimental data where geophones were installed in two mines. Some interesting data and observation techniques are documented. However, the geophones and recording equipment were all located in the mine for the experiments which would be of no use in an emergency.

Bureau of Mines Information Circular 8567, *Evaluation of the Seismic System for Locating Trapped Miners* (1981), which is incorporated by reference herein, incorporates a lot of experimental data generated by Westinghouse Corporation's Mine Emergency Operations Integrated Logistic Support Group, as well as work by the authors Durkin, an electrical engineer from the Bureau of Mines Pittsburgh Research Center; and Greenfield, a professor of geophysics from Penn State University.

There is a lot of information on S/N reduction techniques used by Westinghouse in a 1971 built seismic van. The system describes the use of narrow-band digital notch filtering to remove man made interference, such as power line pickup or seismic disturbances caused by local machinery, by latching onto the fundamental frequency of interference and tracking it if slight variations in frequency occur. The notch filtered signals are then recorded on analog tape and displayed on an oscillograph. By visually monitoring the oscillograph, an operator can determine when a signal occurred.

When the operator determines a signal occurred, the analog tape containing the events are digitized and stored in a computer. The report discusses digital signal processing, such as stacking, to reduce the noise. The stacked signals are then used to determine arrival times for an array of sensors, and thus determine the location of the source. The report goes on the say;

> The present system relies on the operator's ability to determine when a signal has occurred. Manual detection of the signal can be unreliable due to the low SNR often encountered and the inability of the operator to maintain peak performance over extended periods. At present, efforts are being made to automatically detect the miner's signal by computer, thus eliminating possible human error.

It will be argued that even with modern digital systems, this is still an unresolved problem, 37 years later.

The noise spectrum for many cases in nature tend to have a $1/f$ power spectrum, where f is the frequency. This is called pink, or flicker, noise. Based on experimental data, the authors make a good argument that seismic noise, instead, tends to have a power spectrum proportional to $1/\sqrt{f}$. This will be shown hereinbelow to be a competing factor with attenuation, which is less for lower frequency vibrations, i.e., attenuation is lower for low frequency, but background noise is higher at low frequency.

Table 5 of the report makes an argument that the best method for generating underground signals is by a large timber striking a roof bolt. The same large timber striking the floor of the mine produces a signal that is down by 8 dB. Presumably the inverse would also be true for a receiver in the mine detecting a down channel signal, which would imply a transducer attached to a roof bolt would be 8 dB better that a transducer attached to the floor.

Bureau of Mines Information Circular 8907, *Postdisaster Survival and Rescue Research* (1982), under the section FINDING AND COMMUNICATING WITH TRAPPED MINERS, pp. 49-78, which is incorporated by reference herein, describes a system for locating trapped miners. FIG. 6 of the report includes a hardhat sticker with the following instructions for miners.

When escape is cut off, the miner is to
(1) Barricade
(2) Listen for 3 shots
(3) Signal by pounding hard 10 times
(4) Rest 15 minutes, then repeat signal until
(5) You hear 5 shots, which means you are located and help is on the way An equipment truck is dispatched to the emergency and an array of transducers are deployed. When the crew is ready, three explosive charges are detonated to signal the trapped miners to pound on the mine ceiling, as per the hardhat sticker.

In other words, under the MSHA procedure, the miners are to remain alert, 24 hours/day, for days, listening for the 3 shots which could come at any random time. In the case of the Sago emergency, the equipment truck was never dispatched.

The MSHA system is critiqued in *Internal Review of MSHA's Actions at the Sago Mine* (2007), which is incorporated by reference herein. Page 124 states:

> The seismic location system has never located a trapped miner. For example, the system was set up at Quecreek Mine after water inundated the mine. However, the missing miners had been already located when a 6-inch drill steel penetrated the coal seam where the miners were trapped. After rising water forced them away from the 6-inch drill hole, the miners were not heard from again until 73 hours after the inundation when a 30-inch drill hole penetrated the mine.
>
> The miners stated that while they were entrapped, they waited for the three-shot signal from the surface. Although no signals were sent from the surface, the miners continued to pound on a roof bolt in an attempt to signal the surface. Their signaling by pounding on the roof bolt was not heard on the surface, even with the seismic listening equipment, due to high levels of background noise.
>
> The seismic location system was also used following an underground explosion in 1992 at the Southmountain Coal Co., Inc., No. 3 Mine in Wise County, Va. That explosion occurred on December 7 at 6:15 a.m. It was December 9 at 2:25 p.m. before the seismic location system was set up and ready to initiate location of the missing miners more than 54 hours after the explosion.
>
> MSHA's seismic location equipment is based on 26-year old technology and its accuracy is to within 50 to 100 feet.

The report states in the conclusion:

> The truck mounted seismic system is obsolete, takes too long to deploy, and has never located a missing miner.

West Virginia University has conducted extensive research on seismic signal propagation and detection. A 2012 masters thesis by Adeniyi A. Adebisi, supervised by Dr. Keith A. Heasley, *Calculating the Surface Seismic Signal from a Trapped Miner*, which is incorporated by reference herein, provides a good summary and bibliography.

Adebisi includes a theoretical background and up channel experimental data for various mine/driving device combinations. The experimental data included reference geophones in the mines, which provide time synchronization for the signals detected at the surface. Of course a reference geophone in the mine is unrealistic in an actual emergency situation, but good for experimental purposes.

Dr. Heasley was the principal investigator for NIOSH contract 200-2011-39885, a summary of which is available on the NIOSH website. A more detailed report is found in *Development of a Seismic System for Locating Trapped Miners, Final Technical Report Sep. 9, 2011-Apr. 8, 2013*, which is incorporated by reference herein. The report includes experimental data using a seismic system by Sure-Wave Technology, Ltd. A first up channel test, reported in section 5.1, produced marginal detection results from 1140 feet underground. A second up channel test, reported in section 5.2, produced encouraging detection results, up to a depth of 1175 feet.

The procedure was modified in the second test as follows:
For each location underground, the miners pounded a "set" of 5 "repetitions" on the roof with each repetition being about one second apart. They would repeat this 5 repetition set 5 times to make a complete "cycle", starting exactly one minute apart for each set. Since the goal was basically to simply detect the signal at a given depth and horizontal offset, and not to simulate a trapped miner situation, the surface seismic personnel knew the exact location and timing of the underground miner's pounding.

It is not mentioned in the report how the surface seismic personnel knew the exact timing of the underground miner's pounding, but it is assumed the parties were in communication by radio.

FIG. 13 of the report shows a clear signature of 5 events, at a depth of 1175 feet, approximately 1 second apart, and easily detectable from the noise by visual interpretation of the plot. Tests at 1525 and 1700 feet were not detectable by simple visual interpretation of the plots.

The third paragraph of section 9. Recommendations states:

In a real trapped miner situation, it would certainly be advantageous for the seismic system to automatically locate the detected signal with more than just relative signal strength (especially with the problems with ground coupling causing anomalous signal strength).

Note that this is the same problem identified in the 1981 Bureau of Mines Circular 8567, which was discussed hereinabove.

The last paragraph of section 9 states:

At the Sago Mine disaster, the miners were apparently pounding extensively on the roof bolt, and nobody was listening (MSHA, 2007). The underground miners need to know the optimum method for pounding and when to start pounding.

The U.S. Geological Survey (USGS) published an interesting related report; Pratt, Thomas L., 2009, *Finding Trapped Miners by Using a Prototype Seismic Recording System made from Music-Recording Hardware*: U.S. Geological Survey Open-File Report 2009-1095, 35 p., which is incorporated by reference herein.

Pratt teaches the use of commercial, 2009 vintage, music recording equipment for digitally recording geophone data. He used a $3,000 16 channel recording system with $300 customized connectors. An obvious advantage is that the low cost would make it feasible for every mine to have a recording system on site. This would be a clear advantage over the single, MSHA truck mounted, analog tape recording, seismic system.

One disadvantage of music recording systems is the low frequency response rolls off at 20 Hz, i.e., the lower end of human hearing. Since the earth acts as a low pass filter, this could be a limitation. Modern electronics is much better, and more economical, than it was in 2009. Analog to digital (A/D) converts, with computer interfaces, are available that work down to 0 Hz for instrumentation applications, e.g., strain gage measurements.

Pratt made an important observation, which he attributed to "the Conoco researchers", about using higher speed playback to aid in aural analysis of geophone data.

There are two reasons why high-speed playback of the seismic signal makes detection of the taps easier. First, increasing the speed reduces the time between the individual taps to a shorter time interval, which makes the rhythmic "beat" more noticeable. Second, speeding up the recording raises the frequency of the signal closer to the center of the human hearing range. The original taps have frequencies primarily in the 30 to 120 Hz range, which is near the lower limit of human hearing (the range of human hearing is generally regarded as about 20 Hz to 20,000 Hz). Playing the seismic recordings back at 4 times the original speed changes the frequency content of the signal to 120 to 480 Hz, which is solidly within the range of human hearing (nearly equivalent to low C [128 Hz] to high C [512 Hz] on a piano). The taps therefore, change from a muffled "thud" to a sharper, more distinct "tap".

The USGS link to the Pratt report, which is incorporated by reference herein, includes an executive summary, and links to down-loadable WAV and MP3 format audio recordings of an example signal, in both the original format, and replayed at 4 times the original speed. At 4 times speed, the taps are clearly detectable by simple aural analysis, whereas the taps are not detectable at the original playback speed. It is also noted that muffled voices, which were picked up as background noise by the geophone, can be heard in the original recording.

While all of the patents and methods cited hereinabove have merits, they all suffer from shortcomings. For example, some require extensive preparation and pre-positioning of heavy equipment. In an actual emergency, a miner may not be able to get to a predefined location. With more sophisticated equipment, there is an ongoing problem of maintenance to ensure that it will actually work in the rare event it is actually called upon.

A number of problems are obviated by the disclosed invention.

BRIEF SUMMARY OF THE INVENTION

Methods are disclosed for implementing an emergency communications system in compliance with the Mine Improvement and New Emergency Response Act of 2006 (MINER Act), and Mine Safety and Health Administration regulations pertaining to Post-Accident Communications.

Acoustic waves are transmitted bidirectionally through-the-earth in a simple robust architecture in combination with signal-to-noise reduction techniques which ensure the ability to communicate using simple tools available in a mine. An enhanced version includes a personal electronics device designed to be carried by each miner to increase the data rate.

Algorithms for determining time windows for communications are established in order to enhance the signal-to-noise ratio and coordinate the efforts of miners and rescue personnel. There is also a psychological benefit for the miners since they can rest during the breaks between windows and not have to be constantly on alert. Data is encoded in accordance with predetermined encoding schemes in order to ensure proper interpretation of a signal. Digital signal processing is employed to further improve the signal-to-noise. An engineering study is performed to identify sources of noise, steps for noise remediation, transducer locations, and ensure reliable communications with all parts of a mine. An Emergency Response Plan is established and tested.

BRIEF DESCRIPTION OF THE DRAWINGS

In the following detailed description, reference will be made to the accompanying drawings, which serve to illustrate various embodiments of the invention by way of example.

DETAILED DESCRIPTION OF THE INVENTION

What is needed is a robust, yet simple, method for communicating through-the-earth by acoustically generated waves. The prior art described hereinabove may be useful in certain circumstances, but for the most part it all relies on equipment that is too complicated, expensive, or heavy, for reliable emergency use. Moreover, no known prior art teaches improvement of signal-to-noise ratio (S/N) by the combination of techniques disclosed herein.

Figure 1A:
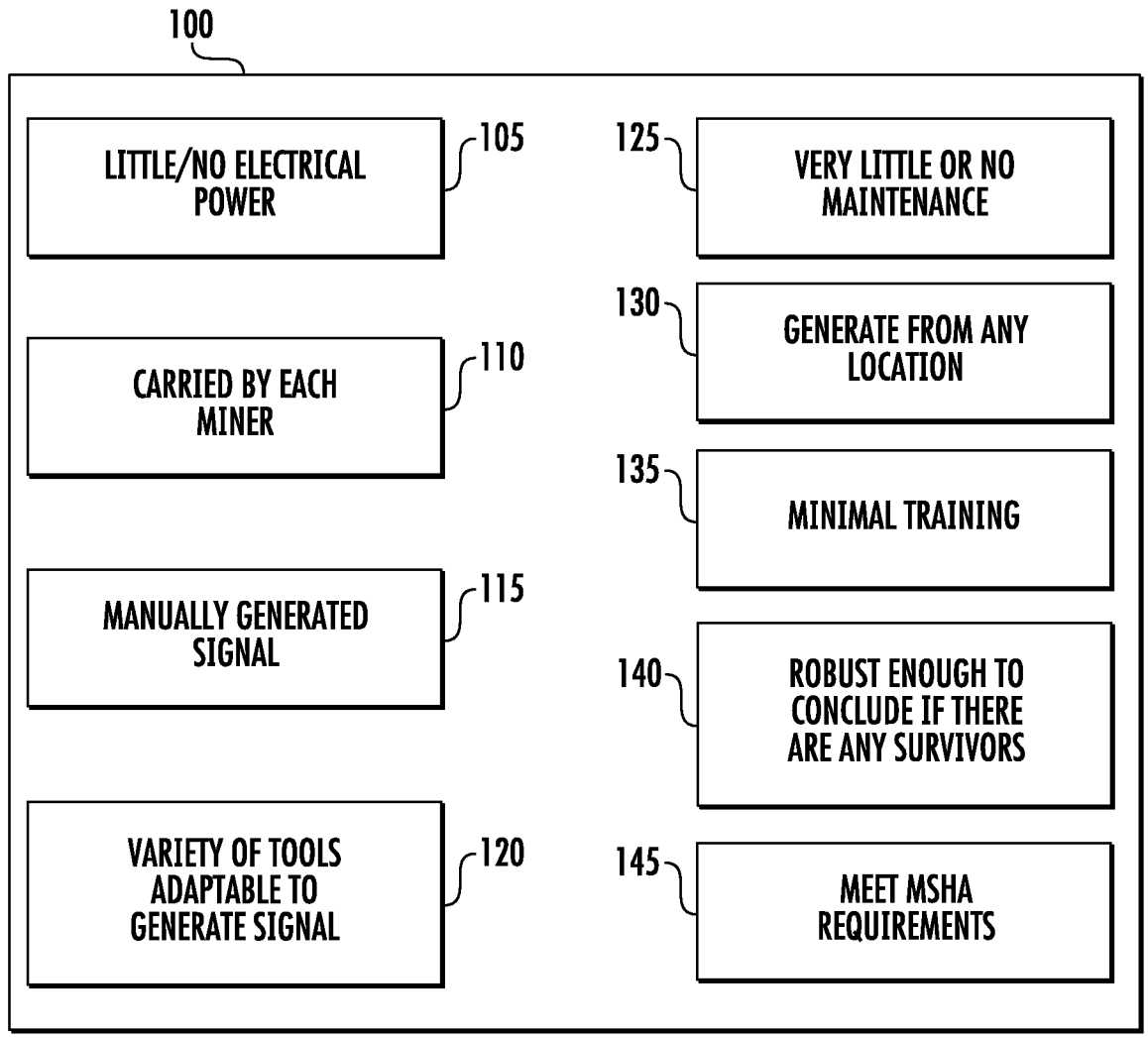
FIG. 1A shows elements of a preferred up channel communications system.

As shown in FIG. 1A, an ideal method at the underground end 100 would require the following.
1. Very little or no electrical power 105 preferably at most no more than the power to operate a flashlight or a cell phone.
2. Be inexpensive and suitable for carrying untethered by each miner at all times 110, e.g., a watch or personal electronic device.
3. A signal could preferably be generated by manual effort 115 and implemented with a variety of tools adapted from items which would already be available in a mine 120.
4. Require very little or no maintenance of underground equipment 125.
5. It could be implemented from anywhere in the mine 130, i.e., would not require pre positioning equipment at predefined locations which must be maintained and may not be accessible in an emergency.
6. Personnel training should be minimal and easy to understand 135.
7. Emphasis should be placed on reliability over bandwidth 140, i.e., it is more important to signal that there are survivors than it is to carry on high bandwidth voice communication particularly for the channel communicating from the miner to rescuers.
8. The system should be robust enough that the absence of a signal could be reasonably used to conclude that there are no survivors, and thus avoid exposing rescuers to unnecessary risks.
9. Emergency Response Plans (ERPs) prepared around the method must meet the requirements of MSHA PROGRAM POLICY LETTER NO. P16-V-01 and other regulations 145.

Figure 1B:
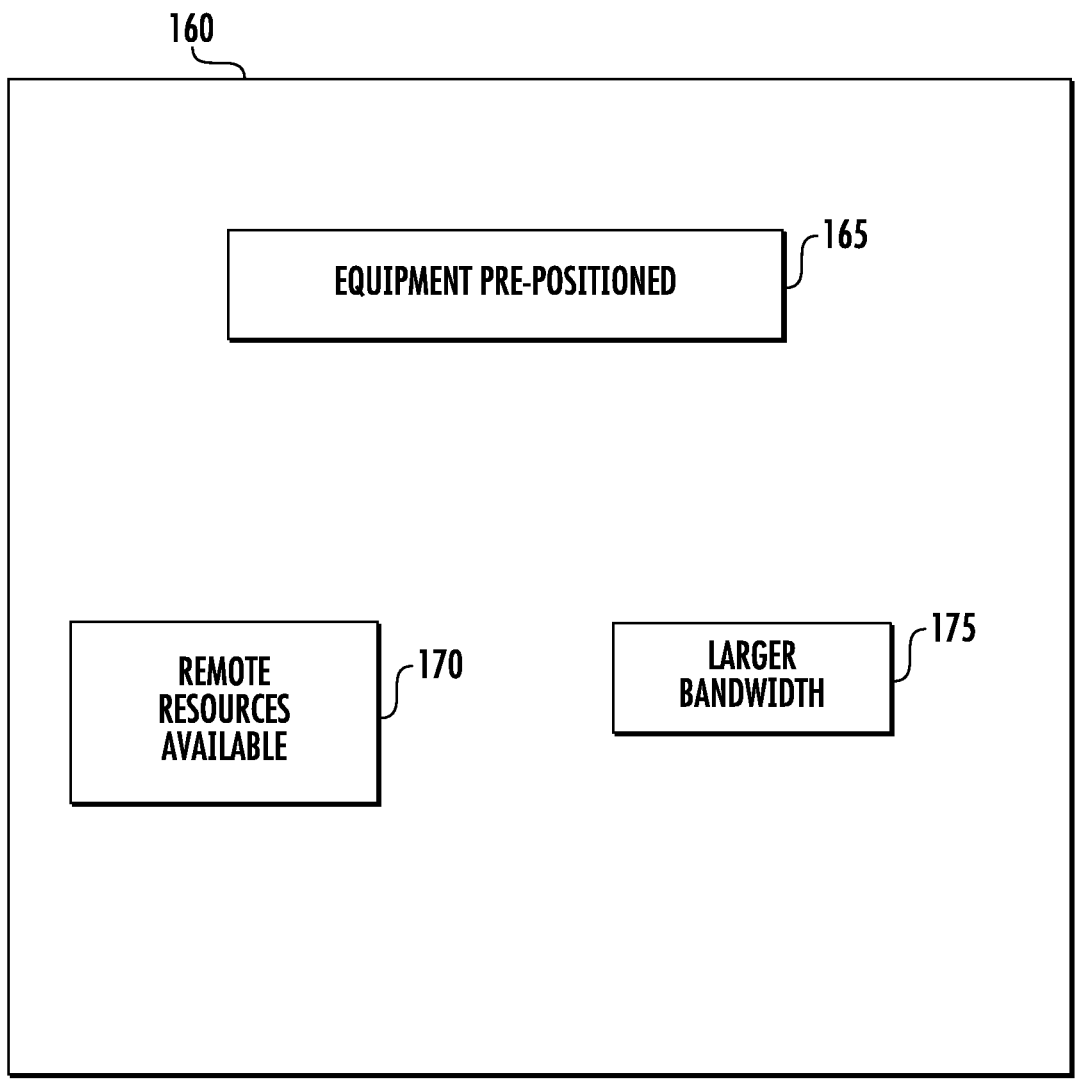
FIG. 1B shows elements of a preferred down channel communications system.

As shown in FIG. 1B the above ground equipment 160 could be much more sophisticated, but ideally would be economical enough to have necessary field components, such as transducers and communications equipment, pre positioned at every working mine for quick response 165. Other components, such as digital signal processing computing equipment, communications equipment, and technical experts, could be remotely located at a central laboratory 170. This would avoid duplication of equipment and allow some of the expenses to be shared by the industry. The bandwidth from the rescuers to the miners may be larger 175, which may be used to minimize the necessary response from the miner to simply yes and no replies to a series of questions.

This invention discloses such a method for emergency mine communications. While the invention will be illustrated by examples in the most basic and robust forms, enhanced embodiments would be practical for established shelter facilities that may include more resources.

From the CANMET-MMSL 09-004(TR) report cited hereinabove, it is clear that none of the existing systems meet the criteria. It will be shown that an acoustic system in combination with engineering, planning, and signal processing, is capable of meeting the criteria.

The fundamental problem is a matter of S/N. A miner randomly pounding on a mine wall or ceiling with a sledge hammer will probably go undetected above ground for a number of reasons.

Even with mine activities stopped in an emergency, there will be a lot of equipment running. For example, there will probably be ventilation systems, pumping systems, and other necessary utility systems operating. There may also be drilling operations, emergency power generators, earth moving equipment, chainsaws, construction, etc., making preparations for a rescue attempt. It may not be practical to shut all equipment down to "listen" for a faint sound. It will be understood that the term "listen" as used herein is used in the general sense of detecting mechanical vibrations of all acoustic frequencies and not limited to human aural frequencies or human senses, i.e., may include electronic detection and recording. Moreover, the protocol in the Bureau of Mines Circular 8567, described hereinabove, as to when to listen for signaling from underground was not mentioned as being successful in the accounts of any of the historic cases. In fact, the miners in the Sago mine specifically reported that they never heard the prescribed three shots. In general, it would be hit-and-miss to detect an underground signal. Example protocols which enhance the probability of a faint signal being detected will be disclosed which serve to illustrate the spirit and scope of the invention.

There are signal processing techniques that can be adapted to greatly improve the S/N. In general, the techniques may be different for communication from the miner (s) to the rescuers, which will hereinafter be referred to as the "up channel"; and for communication from the rescuers to the miner(s), which will hereinafter be referred to as the "down channel".

Fundamentals of Geophysics

A brief review of the relevant, most closely connected, non-patent literature and published patent literature prior art will be useful background information which will help in understanding the development of the spirit and scope of the invention and develop the theoretical basis of the physics involved.

In 1920, J. C. Karcher was working on methods of sound ranging to detect artillery for the United States Bureau of Standards (now National Institute of Standards and Technology), as describe in an article in Wikipedia. Working with professors at the University of Oklahoma, he thought that the same methods could be used for seismic exploration. They formed a company in 1920, which eventually became Texas Instruments, to demonstrate the technique. In a parallel path, Ludger Mintrop was developing similar ideas in Germany, which led to U.S. Pat. Nos. 1,451,080, and 1,599,538, both of which are incorporated by reference herein.

Since the earliest seismic reflection field test by J. C. Karcher on Jun. 4, 1921 in central Oklahoma, which was commemorated by the Geophysical Society of Oklahoma City on the 50 year anniversary by placing a monument on the site as noted in *Introduction to Geophysical Prospecting*, Dorbin, (Dobrin) p. 10-11, incorporated by reference herein—there have been technical advances made in geophysics, seismic surveying (or seismic exploration), and drilling which can be applied to the problem of acoustic communications. For example, it is common practice in the drilling art to communicate with a drill string via acoustic communications for measurement while drilling (MWD), and logging while drilling (LWD). It is also common practice to introduce high power modulated seismic waves into the earth for seismic surveying. Digital signal processing techniques are also well known in the art.

Turning first to the non-patent literature; *Introduction to Applied Geophysics*, Burger, Sheehan, and Jones (Burger) is a modern introduction to geophysics. Chapter 2, which is incorporated by reference herein, covers Seismic Exploration: Fundamental Considerations. In section 2.1.3, Burger describes P-waves, S-waves, and surface waves in detail which will not be repeated herein. Table 2.2 tabulates representative P-wave velocities for some common materials. For example; air=331.5 m/s, soil=250-600 m/s, clay=1100-2500 m/s, saturated sandstone=800-2200 m/s, limestone=2000-6000 m/s. The dispersion which generally causes sound to travel slower through the upper level of the earth presents problems in seismic exploration which will be addressed by signal processing techniques discussed hereinbelow. In section 2.3.1, Burger describes Spherical Spreading and points out that for a point source, the energy falls off as $1/r^2$ where r is the radial distance from the point source, whereas the amplitude of a vibration is proportional to the square root of the energy, and thus the amplitude falls off as $1/r$. In section 2.3.2, Burger describes Absorption, and it can be shown that the combined reduction in elastic energy can be expressed as $$I = I_0 \left(\frac{r_0}{r}\right)^2 e^{-qr} \tag{1}$$

where I is the energy intensity at a distance r from a point source, $I_0$ is the energy intensity at a distance $r_0$, q is the absorption coefficient in dB/λ, and λ is the wavelength, i.e., the speed of sound/frequency. Section 2-6 of Dobrin (cited hereinabove), which is incorporated be reference herein, explains how the absorption coefficient can be related to the quality factor Q, which is well known in the art.

As explained in section 3.5 of *An Introduction to Geophysical Exploration*, Kearey and Brooks (Kearey), incorporated by reference herein;

Over the range of frequencies utilized in seismic surveying the absorption coefficient is normally assumed to be independent of frequency. If the amount of absorption per wavelength is constant, it follows that higher frequency waves attenuate more rapidly than lower frequency waves as a function of time or distance. To illustrate this point, consider two waves with frequencies of 10 Hz and 100 Hz to propagate through rock in which $\upsilon_p$=2.0 km s$^{-1}$ and α=0.5 dBλ$^{-1}$. The 100 Hz wave (λ=20 m) will be attenuated due to absorption by 5 dB over a distance of 200 m, whereas the 10 Hz wave (λ=200 m) will be attenuated by only 0.5 dB over the same distance. The shape of a seismic pulse with a broad frequency content therefore changes continuously during propagation due to the progressive loss of the higher frequencies. In general, the effect of absorption is to produce a progressive lengthening of the seismic pulse.

The implications of the fact that absorption per wavelength is constant is further explained by Burger in section 2.3.2, which points out that the earth is a low-pass filter, and slower S-waves are attenuated more than faster P-waves. Note that as shown in the example, the absorption of low frequency sound waves through rock is orders of magnitude less than the absorption of electromagnetic waves, which makes acoustic communications fundamentally practical where electromagnetic communications is not.

Burger covers Energy Sources for producing vibrations, in section 2.4. Weight drop, explosive, and vibratory sources are outlined in section 2.4.1, including the following description of hammer sources, which will be useful hereinbelow;

The simplest example of the weight drop is the hammer source. A sledgehammer, usually 5.4 or 7.3 kg, is swung against a metal plate to more efficiently couple the energy transfer. Obviously the energy imparted is not great, and in the past a hammer source was used only for very shallow investigations. The hammer blow became a more useful source with the advent of relatively inexpensive instruments that could sum ground motion for a number of impacts and thus enhance the waveforms on records. Under good conditions a hammer source routinely can detect the overburden-bedrock interface at depths of 50 meters or slightly more.

It should be noted that in the last sentence of the quote above, Burger is saying that under good conditions; a hammer can be used to generate a vibration that travels up to 50 meters through-the-earth, a fraction of the vibrational energy reflects off the overburden-bedrock interface and travels back 50 meters through-the-earth, and is detected with sufficient accuracy to determine the depth of the interface. Clearly it would be detectable for a distance much greater than 100 meters in a direct line, without reflecting a fraction of the energy, and traveling substantially through rock instead of exclusively through overburden.

In the previously cited US 2009/0316530, Bunyard et al. report a S/N level of 35.9 dB at a distance of 460 m for a sledge hammer strike. They estimate a S/N of 9 dB at 862 m. Recall that Quecreek was a depth of 73 m, Sago was 85 m, Crandall Canyon was 457 m and San José was 701 m. With signal processing, it is reasonable to detect a signal at levels much lower than a S/N of 9 dB.

Figure 2:
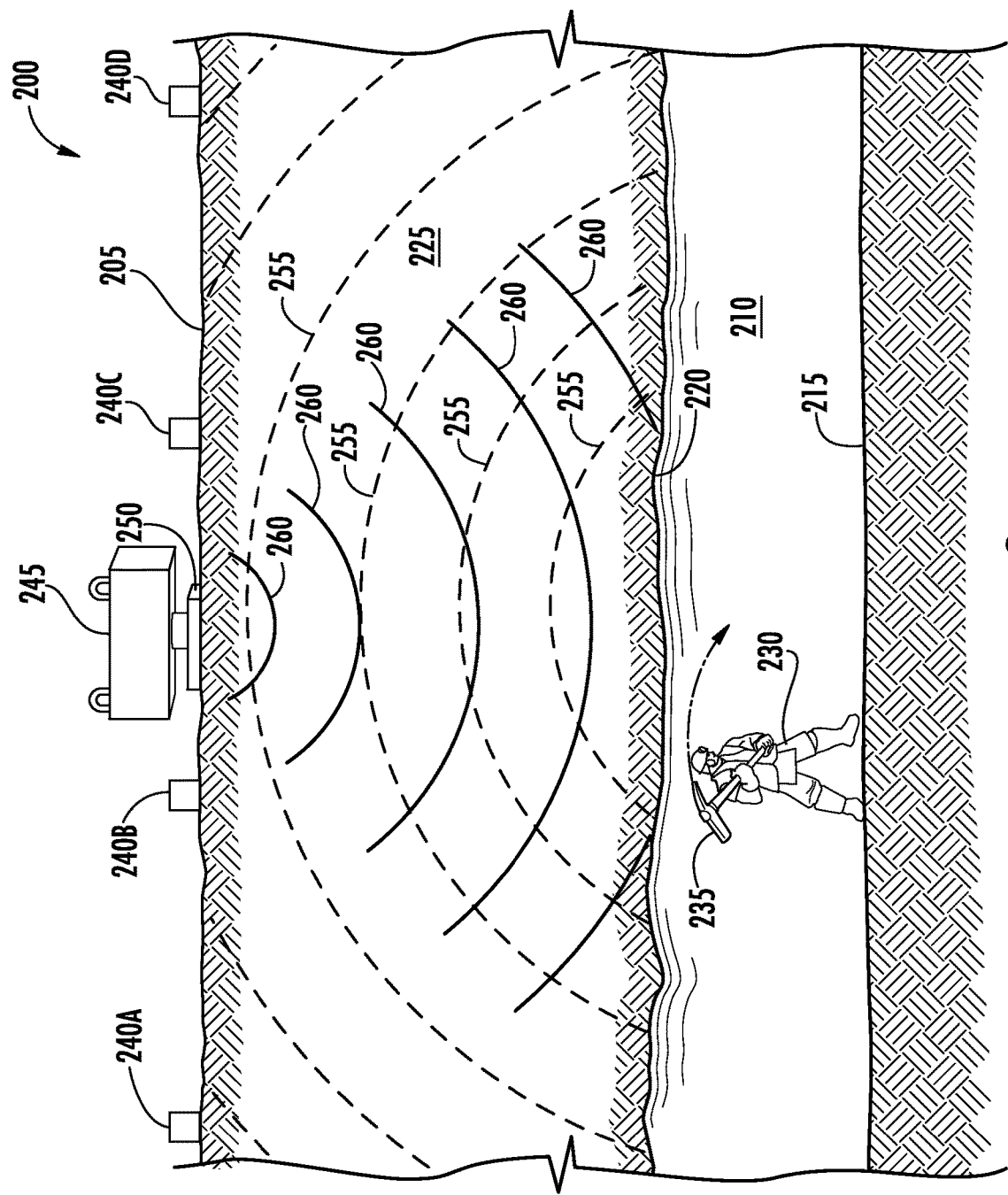
FIG. 2 shows a sectional view of the underground and surface architecture of an embodiment of the invention.

In FIG. 2.26 of section 2.4.1, Burger shows a plot of energy vs frequency for an 8-gage shotgun, a 12-gage shotgun, a 75 kg weight drop, and a 7.3 kg hammer. All sources show similar characteristics of maximum energy between 200 and 400 Hz. As explained hereinabove, the higher frequencies will be attenuated more as the vibrations propagate, so the shape of the curves would change with distance from the source.

Turning now to the published patent literature, U.S. Pat. No. 2,688,124 ('124) to Doty and Crawford, incorporated by reference herein, discloses correlation techniques developed by Continental Oil Company which uses vibrators to produce semi-continuous signals instead of impulse functions produced by explosions. Known as the Vibroseis® system, signals are produced by vibrators anchored to the earth which produce 10 to 20 ton forces—much like a programmable function generator for seismic waves.

Doty and Crawford used a vibrator comprising counter-rotating off-center weights to produce P-waves directed into the earth. The vibrator was driven by a motor which was swept from 20 Hz to 80 Hz over a 4 second sweep, and then repeated as needed to gather sufficient data. A transducer, or array of transducers, were placed away from the vibrator to detect reflected vibrations. A "counterpart" of the transmitted signal was detected near the vibrator. The counterpart and reflected signals were recorded in separate channels on a magnetic drum. The time delay was determined in post processing by cross-correlating the two signals.

The Continental Oil Company '124 patent to Doty and Crawford, filed in 1953, is considered to be a pioneering patent in the field, the historical development of which was published by a member of the development team in Vibroseis, Nigel A. Anstey, Prentice Hall, 1991. A key factor in the development, as explained by Anstey, was a short course Doty attended that explained chirped radar, developed during WW II, after it became de-classified. Doty realized he could greatly improve the coupling efficiency over explosive charges, as used by Karcher in 1921, by driving lower frequency vibrations, which as explained hereinabove are attenuated much less than the higher frequencies produced by explosives. Moreover, he could avoid the problem of the absolute distance ambiguity by using a chirped signal—much like chirped radar.

Doty and Crawford et al. made additional improvements in the signal processing methods and apparatus in U.S. Pat. Nos. 2,808,577; 2,874,795; 2,910,134; 2,989,726; and 3,209,322; all of which are incorporated by reference herein.

U.S. Pat. No. 4,486,866 to Muir, incorporated by reference herein, discloses methods for seismic exploration using vibratory sources to inject coded vibrations into the earth and correlating received signals to improve S/N.

U.S. Pat. No. 4,866,680 to Scherbatskoy, incorporated by reference herein, discloses methods for improving S/N for MWD using telemetry data transmitted through drilling fluid.

U.S. Pat. No. 5,850,369 to Rorden et al., incorporated by reference herein, discloses a system in which a chirp and two tones are transmitted acoustically through-the-earth to synchronize downhole and surface clocks.

U.S. Pat. No. 6,308,137 to Underhill et al., incorporated by reference herein, discloses methods for MWD wherein acoustic communication is on a schedule which is known by the downhole equipment. Of course this require time synchronization between the surface and downhole equipment, but it improves S/N and conserves power.

U.S. Pat. No. 6,400,646 to Shah et al., incorporated by reference herein, discloses a system in which the downhole and surface clocks are synchronized by acoustic communications with millisecond accuracy.

U.S. Pat. No. 6,530,263 to Chana, incorporated by reference herein, discloses a method for detecting leaks in a pipeline by using an array of loggers which record data for post-processing by correlation.

U.S. Pat. No. 6,584,406 to Harmon et al., incorporated by reference herein, discloses a seismic communications system for signaling a device in a borehole—such as an oil well. A control system generates coded signals which are transmitted through-the-earth to devices near the bottom of the well by modulating a Vibroseis® transducer at the surface. Geophones at the surface monitor the Vibroseis® generated signal, and provide feedback to the control system to ensure proper encoding is generated. A receiver in the well decodes the seismic signal using a microprocessor and digital signal processing. The decoded seismic signal is then used to instruct devices in the well. In one preferred embodiment, instructions are transmitted to fire a gun which perforates the well casing to produce the well.

U.S. Pat. No. 7,929,380 to Wei et al., incorporated by reference herein, discloses an apparatus for generating seismic signals.

While the field of geophysics is well developed for seismic exploration, there are no known adaptations of the technology to emergency communications—which this invention obviates.

Solution to the Problem

Having developed a background in the physics of the subject matter and the prior art, it will now be shown how acoustic waves can be used in new ways for emergency mine communications.

Consider the following pedagogical example of a method for emergency communications, which will later be modified into practical embodiments. In '124 to Doty and Crawford, as described hereinabove, the objective is to measure the time delay between a signal source and detector for seismic waves reflected by underground discontinuities, i.e., changes in rock formations. One complication addressed by '124, and their subsequent patents, is the fact that in addition to the reflected waves of interest, there are also seismic waves transmitted directly between the source and detector. For seismic exploration, this is considered to be noise.

For the problem at hand, it is clear that this noise can be considered a communication channel between the source and detector which can be detected by cross-correlating the detected signal with the "counterpart" signal generated near the source. Of course both the source and detector are located on the surface for seismic exploration purposes.

Suppose the architecture was modified and the source was located in a mine, and the detector was located on the surface in relative proximity to the mine. For pedagogical purposes the mechanism would be symmetric and the locations of the source and detector could be reversed with the same results. For this purpose, also assume for the moment that there is an electrical signal between the source and the detector to transmit the "counterpart" signal to the detector end. It is clear that the source could send signals through-the-earth to the detector which could be decoded with the assistance of a computer to record and cross-correlate the "counterpart" and detected signals, i.e., an up channel. It is also clear that the same system could be reversed to communicate a down channel.

Of course it would be absurd to go to such measures if there was wiring to connect the "counterpart" with the detector end, i.e., one would simply use the wiring for the counterpart for a communications system. In the absence of a counterpart signal—as one would expect in the case of an emergency—there are other techniques that will be shown to be useful to recover a seismic signal.

It would be highly unlikely that a miner would have a vibrator as used in '124 at his disposal in an emergency situation. While it would be possible to have vibrators driven by battery power, manual crank mechanisms, compressed air, mechanical wind-up mechanisms, weight driven mechanisms, or the like, positioned at staging areas; it would not meet the requirements for a robust emergency communications system 100 as outlined hereinabove.

Starting with a system as described in '124 without the counterpart signal and without the vibrator to generate seismic systems, a practical system 200 will be developed as shown in FIG. 2. A sectional view shows the ground level 205 and underground level including the mine wall 210, mine floor 215 and mine roof 220. Between the ground level 205 and the mine roof 220 is a layer of rock and overburden 225. A miner 230 strikes the mine wall 210 with an tool 235 such as a sledge hammer or the like. Transducers 240A, 240B, 240C, 240D are located at the ground level 205. A seismic vibration generator 245 has a support 250 in communication with the overburden 225. For the up channel communications, the miner 230 strikes the mine wall 210 with tool 235 producing vibrational waves 255 which radiate through the overburden 225 to the transducers 240A, 240B, 240C, and 240D. For the down channel communications, the seismic vibration generator 245 and support 250 produce vibrational waves 260 which radiate through the overburden 225 to the mine wall 210, mine floor 215 and mine roof 220. It will be understood that the number of transducers shown is merely exemplary and could be as few as one, or a large array.

As shown hereinabove, higher frequency vibrations are attenuated more than low frequency vibrations. It is well known in the art that explosions and hammers produce impulse functions which are rich in higher frequency components. Hence the vibrator generator taught in '124 is much more efficient than the explosion source used by Karcher. However, it is likely that the only seismic wave generator mechanism available to a miner would be manually striking the mine wall or ceiling with a hammer, battering ram, rock, or the like. For the up channel, the highly attenuated higher frequency components of such a mechanism could be compensated for by bringing more signal processing capabilities to bear on the receiver end.

Signal-to-Noise

The first method to improve S/N is to have an established protocol which sets time of day windows for the miner to signal via the up channel. This protocol which sets the time of day would be determined independently by the miners and the rescue personnel. The time of day could be triggered by an accident in the mine. Since each party would have significant uncertainty in the exact time of the accident, there is a quantization error which could be accounted for by also quantitizing the time of day windows to certain times, e.g., on the half hour mark. Assuming each party has a watch, there will be no ambiguity as to when the communications will start.

The benefits of limiting the search in the time domain to specific windows are manifold, and the use of time of day windows is a major feature of the invention. For example, if the rescuers know that the miner will be signaling in a specific time window, they could switch optional equipment off and cease activities during the specific window. All sensor signals could be recorded to facilitate more powerful post-processing—such as between an array of sensors, or using more powerful computers at laboratories in other parts of the world. The miners could conserve energy by avoiding needless hammering that would probably go undetected, and the anxiety of the miners would be reduced by limiting the windows of time they would need to be responsible for detecting a signal.

For example, a first example protocol would be for the miners to wait to communicate until at least 30 minutes after an accident, and commence communications on the next half hour mark for a window of two minutes. For example, if the accident occurred at 8:15, the rescue team would know to be ready to record signals from 9:00-9:02, 9:30-9:32, 10:00-10:02, etc. This would give the rescuers time to get organized, and it would preserve the energy of the miners.

It will be recognized by those skilled in the art that there would be the possibility of a plurality of separated groups of miners, and there may be overlap in the signals between the groups. This will be addressed hereinbelow in the protocol for the down channel.

By using a known window in time, the chances of a signal being detected would be greatly increased. For example, by comparing sensor signals during the window to signals before and after the window, digital signal processing techniques could be used to detect differences between the window and other times. This is much like the technique used by a lock-in amplifier, which is well known in the art, where the signal is chopped in time. For example the power spectrum during the window may be significantly different than the power spectrum before and after the window. However, this alone may not be enough of an improvement in the S/N to have confidence that there were, or were not, surviving miners trapped below ground.

Another improvement in S/N could be achieved in one preferred embodiment by adding a protocol wherein the miners produced a signal at a known repetition rate, or repetition period, within a prescribed time window. Hereinafter the time of day window will be designated by a format of hour:minute:second. For example, if they used a sledge hammer to strike the mine wall every 10 seconds, as set by a clock, within a two minute window, the strikes would take place at 9:00:00, 9:00:10, 9:00:20, 9:00:30, . . . , 9:01:50. It will be understood by those skilled in the art that times used in examples to illustrate the spirit of the invention are merely examples and not limitations.

Such a signal would lend itself to powerful digital signal processing techniques such as cross-correlation, autocorrelation, Fourier analysis, power spectrum analysis, etc., which are well known to those skilled in the art.

Correlation techniques are well known in the art. Mathematica®, available from Wolfram Research Company, Champaign. Ill., is one software package that includes functions to perform correlation, e.g., ListCorrelate[kernel, list] is one function. The kernel argument corresponds to the "counterpart" signal and the list argument corresponds to the signal. If the kernel and list are the same, it would be the same as autocorrelation. If the kernel is a single signature, such as a stacked signature, it would be the same as cross-correlation. Mathematica® is particularly convenient because it imports, and exports, WAV and MP3 audio files, as well as plays the audio directly from the computer.

An event, such as a hammer strike, typically has a ringing signature with a decaying exponential amplitude envelope. The repetition period should be long enough to allow the previous exponential envelope to substantially decay to the background level, and to allow the person to prepare for the next strike without undue stress. In such a case, the signature of a single hammer strike from 9:00:00-9:00:10 would cross-correlate very well with the signature of the same single hammer strike from 9:00:10-9:00:20, as well as the other 10 second windows between 9:00:00 and 9:02:00. The power spectrum would show strong components around 0.1 Hz and higher harmonics. The presence, or absence, of strong cross-correlation between signatures in the 2 minute window vs before and after would give a much higher confidence as to the presence of survivors below.

Some more common examples will illustrate the idea of digital signal processing techniques. People hear a dripping faucet that repeats at regular intervals, even in the presence of background noise. This is due to psychoacoustics and subconsciously processing the signals in a way analogous to digital signal processing, i.e. it is not only the sound of the drip that is being used to detect the sound. It is not so much the sound or the signature of the drip, as it is the periodic pattern of the low level sound that makes it detectable, much like phase-lock loop detection. It is also clearly detectable if the drip stops or if the repetition rate changes, i.e., if it is modulated. The sound of the drip would probably be very difficult to visually detect on an oscillograph, but could probably be detected by digital signal processing techniques that exploits the characteristics the brain recognizes.

This is also seen in the cocktail party effect where it is common for people to converse in the presence of high background noise. Just as a person can tune to a particular voice or enhance understanding by also watching the speakers lips or body language, digital signal processing techniques can enhance a signal if the model for the signal is known. In this case, the model includes knowing the time of day the signal will occur, the repetition period of the signals, and the fact that the signals will be essentially the same.

Similar examples include when a musician plays a wrong note, or is out of time, which is easily detectable by a listener that knows the song, due to the deviation from the model. On the other hand, if the listener did not know the song, the error may go undetected, i.e., if the model is unknown. A ringing telephone is detectable in the presence of high background noise. This is due to the model of the periodic repeated ringing sound that rings for 2 seconds, followed by 4 seconds of silence, for plain old telephone service (POTS). If a person thinks they heard the phone ringing, they start listening for the familiar periodic sound pattern of the model they know for a telephone. Same for hearing a baby cry.

The key is to develop a model for seismic signaling, and then develop digital signal processing techniques that exploit the model. This helps explain why playing a recording back at higher speed, as described in the USGS Report 2009-1095, described hereinabove, helps to detect the sounds, i.e., it gives the sound a familiar rhythm model.

In cases where signals are know to be periodic, the S/N is improved by stacking the signals, or performing an ensemble average. For example, if a signal s is sampled j times over a period of the signal, and the signal is repeated k times, an averaged signal S can be constructed that reduces the noise, where $$S(i) = \sum_{n=0}^{k-1} s(i+nj) \qquad (2)$$

for i=1 to j. For example, if the signal s is sampled at 10 kHz, and repeated every 10 seconds, j=$10^4$ samples for a signature. If the signature is repeated every $10^4$ samples $$S(i)=s(i)s(i+10^4)s(i+2\times10^4)s(i+3\times10^4) \ldots s(i+(k-1)\times 10^4). \qquad (3)$$

It should be noted that even if the actual starting time is not known exactly, each term in equation 3 will be offset by the same constant, and the signals will still stack properly. The critical factor is that the repetition period be maintained. In such a case, the signatures will be added, while random noise will average to zero. This process will significantly improve the S/N. The stacked signal S will be a cleaner "counterpart", or kernel, as it is called in the Mathematica® ListCorrelate function. The kernel can be cross-correlated with the full sequence of signals s to detect the presence, or absence, and delay, of each individual strike.

In practice, the repetition period for manual strikes will not be exactly on time. By cross-correlating a first signature with all the other signatures, the time variations can be determined. Then equation 3 can be adjusted accordingly to exactly match the signatures to be stacked, thus producing an improved kernel.

Most background vibrational noise will be due to operating machinery and $1/\sqrt{f}$ noise, as described hereinabove in Bureau of Mines Circular 8567. For electrical equipment, large machines may be driven by synchronous motors, which are known in the art to be useful for improving the power factor (and thus reduce electrical power expense) for the electrical distribution system. Such machines will be highly repeatable at the power line frequency, or integer sub frequencies for large machines. In the US, electric power is distributed by a large power grid at 60.0 Hz. Due to the large capacity of the grid, the frequency is held very stable over short term periods as a result of the fact that all of the generators and motors on the grid are connected and operate together, i.e., the angular momentum of all of the rotating equipment on the grid acts as a low pass filter. A large compressor with a four pole synchronous motor will be mechanically driven at 30.0 Hz with little variation in vibrations for a constant load.

For example, oscilloscopes usually have provisions for a "line" trigger capability. When triggering on "line", electrical noise that is synchronized with the AC power source, such as noise generated by fluorescent lights, is stationary on the display. This makes other signals detectable in the presence of noise which may otherwise totally hide the signal. The same technique can be used to remove repeatable, periodic, steady state, vibrational noise in a transducer signal.

An ensemble average of steady state signals, triggered on "line", prior to a communications window could be subtracted from the detected signal during the communications window to greatly improve the S/N. Likewise, an ensemble average immediately after the communications window could also be used to improve the S/N in post-processing of the data. If there are dead times within the window, such as time allowances for the miner to prepare for the next hammer strike, the ensemble average could be conducted during the dead time—which would be closer to the actual conditions immediately prior or subsequent to the active portion of the window. Above ground instruments can be synchronized to the power line directly. Below ground instruments would not have access to the power line, but there will likely be a dominant vibration which is synchronized to subharmonics of 60 Hz.

Heavy machinery may be automatically unloaded during the communications window to further reduce background noise. For example, a large compressor, chiller, blower, or the like, may simply freewheel during the communications window, and quickly switch back into service after the window. Unloading a compressor could be achieved by simply modifying the control system that normally unloads the compressor when the receiver has reached the upper pressure set point. Unloading a chiller could be achieved by simply modifying the control system that normally unloads the chiller when the desired temperature is reached. Unloading a blower could be achieved by closing dampers, thus reducing the volume of air forced through the ducts. This would avoid having to restart heavy equipment, which can require significant effort and danger of equipment failure.

Non-synchronous AC electric motors and Diesel driven engines are still highly periodic—although not as periodic as synchronous motors—and background vibrations may be reduced somewhat using the same technique. For example, a trigger signal may be generated by a transducer mounted on the crankshaft of a large diesel pump to remove periodic, steady state, noise due to the pump. Non-synchronous AC electric motors operate by what is known in the art as slip, i.e., the motor rotor rotates at a slightly lower frequency than the distribution frequency divided by an integer, e.g., 58, 25, 12, etc. Hz. The amount of slip is determined by the load, and can change dynamically based on the load. In addition to not being synchronized with the power distribution, they are also not synchronized with each other. This can produce beat frequencies in the vibrations. By including trigger signals from all large motors, further noise subtraction is possible. For example, the amplitude and phase of a signal synchronous with the trigger signal can be determined using techniques which are well known in the art, such as Fourier analysis, lock-in amplifiers, etc. Each signal component can then be removed in a post processing operation. Fortunately, most large motors are synchronous, and most essential services would not use DC motors.

In addition to giving priority to using synchronous motors for essential services that could not easily be switch off in an emergency, a master control system could be designed that would easily unload essential motors for short periods of time corresponding to the communications windows. Loading and unloading heavy machinery may need to be coordinated to avoid large power surges, which could trip overload protection relays. Plans could also be developed for reducing vibrations from such sources as railroad and roadway traffic for short periods of time in order to facilitate acoustic communications.

In preparation for a mine emergency, an engineering study could be conducted to determine the requirements for a particular mine in order to reduce the background seismic vibrations to an acceptable level for that particular mine. For example, requirements for a particular mine may depend on such things as soil and rock types and the absorption coefficients, maximum depth of the mine, distribution of transducers, layout of the mine, on-site equipment, off-site equipment, local transportation systems, etc.

For a process such as manually swinging a sledge hammer, the signal will not be exactly periodic, i.e., there will be a slight variation in the time between hammer strikes. The signals can not be averaged by such a technique. However, if the same hammer strikes the same location and with the same force, the signatures—or shape of the waveform—produced will be closely repeated. For hammer strikes, it is desirable that the same miner conduct all hammer strikes, as opposed to two miners interlacing strikes, i.e., like two railroad gandy dancers driving a spike in the old western movies. For signals generated by such mechanisms as a battering ram driven by a crew of miners, it would be less specific to an individual, but the same crew chief would be preferable.

This property can be exploited by cross-correlating the signals for each individual cycle, or autocorrelating across multiple signatures. When the signals match, there will be a strong peak in the correlation between the signals. This will be true whether the signal is produced by a sledge hammer, a rock pounding on the mine floor, a backhoe pounding on the mine ceiling, a battering ram pounding on the mine wall, or whatever mechanism is used to produce the repeatable seismic vibration. The only requirement is that the same mechanism is used each time. In such a case, a signal generated at a first time is correlated with a similar signal generated at a second time, i.e., the signal generated at the first time replaces the "counterpart" signal of '124. The second signal can be thought of as a copy of the first signal delayed by the time between signals. In other words, by exploiting the symmetry between signals, the independent "counterpart" signal is not required to discriminate the signal from the background.

By knowing that the rescuers are looking for a signal within a prescribed synchronized time window (e.g., starting on the half hour for 2 minutes); that whatever the signal is, it will have the same signature; that it will have a known period, within a small time variation (e.g. repeating on 10 second timed intervals); makes the signal much more likely to be detected—because these constraints provide information to develop a model that is useful for both aural detection and digital signal processing. It also builds confidence that there are no survivors in the absence of a received signal, which can also reduce the risk for rescuers that may otherwise risk early entry into an unstable mine.

By treating each event as a separate set of data, each set of data may be processed in combination with each other set of data. It is well known in the art that the number of combinations C of k events taken in combinations of r is $$C(k, r) = \frac{k!}{r!(k-r)!}. \tag{4}$$

For example, for a 2 minute window with events spaced by 10 seconds, k=12. If all possible pairs of events are cross-correlated, r=2, or $$C(12, 2) = \frac{12!}{2!(10)!} = 66 \tag{5}$$

which means that 12 events, such as hammer strikes, correspond to 66 combinations that can be used to extract a faint signal from the noise. If 2 transducers are used in an array, the number of combinations is 276. If 3 transducers are used in an array, the number of combinations is 630, etc.

It is well known in the art that the cross-correlation between two signals produces a peak corresponding to the time shift $\tau$ between the two signals. If a hammer is struck precisely on 10 second intervals, the cross-correlation between any pair of 10 second signals will produce a peak for $\tau=0$ time shift. However, if one hammer strike is 100 ms out of sync with the 10 second spacing, the peak will occur at a corresponding $\tau=100$ ms delay. Since it would be highly unlikely that a miner could control the timing to better than a second, the 66 cross-correlations would probably produce 66 peaks centered around $\tau=0$ seconds, but have a distribution with a standard deviation of the order of 1 second.

An impact will probably produce a ringing exponentially decaying vibration with a fundamental vibrational mode, or natural frequency, at frequency $f_0$, i.e., like ringing a bell. The natural frequency will depend on a number of unknown factors, such as: the materials properties of the rock and soil, the impacting device, the reproducibility of the impacts, how the impact is coupled into the rock formation (striking an anchor bolt vs striking rock directly) and other factors. Cross-correlation of two similar ringing signals will produce a maximum peak corresponding to $\tau=0$, but will also produce secondary peaks corresponding to $\tau=1/f_0, 2/f_0, \ldots m/f_0$ where m is an integer. Thus the secondary peaks may be used to further detect the signature of a signal. In other words, the peaks of the correlation will be spaced in time in accordance with the delay between impacts, and secondary peaks will be characteristic of the natural frequency. It is well known in the art that driven signals will produce frequencies at the fundamental and higher harmonics instead of the natural frequency. Thus the signature of the correlation functions can be used to differentiate a driven signal from a natural frequency vibration.

If an array of receivers are used above ground, the signals can be cross-correlated between the receivers for the same events. In this situation, there may be a stronger correlation since the same signals would be cross-correlated. The time delay T would be a function of the difference in transmission time between the source and the receivers, which would be a constant for each event. In this case, there would be a strong cross-correlation peak every 10 seconds or so during the up channel communication window which would disappear outside the up channel communication window.

Other sources of sound will be repeated also. For example, an air compressor, diesel engine, transformer humm, etc. will produce background noise that is also highly repeatable. Cross-correlation of those signals will also produce strong peaks centered around τ=0 seconds. If the load remained constant, they would have a much narrower standard deviation. For example, a bulldozer idling would have a very repeatable signal. The same bulldozer pushing dirt or navigating over uneven ground may not exhibit such a repeatable signal. Non-synchronous motors producing beat note signals will also repeat at the beat note frequency, which can have relatively long periods between repetitions. In some cases, it may be possible to identify and remove the repeatable background noise, including beat notes.

For array receivers cross-correlated for the same events, the background noise would produce peaks with a delay τ equal to the delay in the background noise traveling to the receivers. For example, if a transducer is located 2 ms from a noise source, and another transducer is 3 ms from the same noise source, there will be a strong cross-correlation between the two transducers with a τ of 1 ms. However, this peak in the cross-correlation will be a constant and easily ruled out as a signal from a miner. Moreover, this could be isolated in an engineering study and included in the processing software.

One possible modulation scheme could be to phase shift the hammer strikes within the 10 second window. This is similar to what is known in the art as Phase Shift Keying (PSK). For example, if the even hammer strikes are shifted by half the repetition rate, or 5 seconds, cross-correlation between the even and odd signatures would produce peaks at τ=5 second delays. For example 9:00:00, 9:00:15, 9:00:20, 9:00:35, 9:00:40 . . . instead of 9:00:00, 9:00:10, 9:00:20, 9:00:30, 9:00:40 . . . . Such a scheme could be used to generate a simple binary (1,0) or (yes, no) reply to a question transmitted from above via the down channel. The repetition rate can be thought of as analogous to the baud rate in serial communication schemes such as RS-232 or RS-485.

Another possible modulation scheme, based on the fact that the clocks are synchronized to much better that 10 seconds, could be to respond on the even times and skip the odd times for a yes, i.e., 9:00:00, 9:00:20, 9:00:40 . . . and respond on the odd times and skip the even times for a no, i.e., 9:00:10, 9:00:30, 9:00:50 . . . . There should be a signal to indicate that an instruction or question was not clear or needs to be repeated and can not be answered yes or no. The possible encoding schemes for even such a simple mechanism are more than sufficient to convey the most important information. The exact scheme would have to be worked out and promulgated to all parties through training programs as part of the ERP.

The hardware requirements for the up channel from the miner end would be minimal. In the most elementary case, the timing could be derived from a simple watch. If there are two or more miners in a group, one miner could call out the timing, or cadence, to the miner producing the vibration, e.g., "on three, two, one, hit".

A more advanced device would be a digital personal electronics device—much like a cell phone with a miner application software package, or a modified radio unit—with a display and input device. It could also be a stand-alone personal electronics device, but the cost for incorporating into a device that already has most of the hardware, and is already MSHA approved, would possibly be reduced.

According to MSHA statistics published for 2015, there were 43,747 underground miners. Coal operators produced 72.4 million employee hours and coal contractors produced 6.6 million employee hours, out of a total 105.8 million employee hours, or about 75% of the employee hours were underground coal related. From these statistics, it can be argued that there were around 32,800 underground coal miners in 2015. If the differential cost per radio was $100, every underground coal miner in 2015 could have been equipped with a personal electronics device for around $3,280,000, by phasing in replacement radios with the features, as older radios were retired.

More sophisticated timing could be keyed in to produce the timing for a modulated signal. The screen could be color coded or modulated to count down the sequence, e.g., four seconds before the hit, start flashing a yellow screen every second for 3 seconds and a green screen on the second to hit. Alternatively, the device could have a speaker to deliver sounds, like a metronome, to count down the sequence. Error detection could also be encoded by including something like a parity bit. The receiving electronics would then decode the encoded message back into the coordinates of the location. Such a scheme could compensate for the low bandwidth.

For example, the coordinates of a location in the mine could be entered as text, and the personal electronics device could convert it to PSK sequences. At a higher level, the personal electronics device could compress the text into a more compact code requiring less information being communicated—much like MP3 compresses music files or JPEG compresses image files.

The basic information that will be needed could be reduced to simple codes—much like the 10-XY codes used by law enforcement for radio transmissions, and shorthand used by waitresses. For example instead of sending the down channel message "what is your location" and responding with the up channel message "150 feet from the mine face", the down channel message "10-20" could be responded to by the up channel message "59325-25163", where the location is 59 minutes 32.5 seconds N, 25 minutes 16.3 seconds W, or in the absence of a detectable down channel message, simply sending the up channel message "20-59325-25163" in hopes that it will be recorded and decoded. Determination of the coordinates could be determined from a map stored in the personal electronics device, and encoded by the device into a pounding sequence.

The power requirement for a timing device would be minimal. Moreover, the screen could be switched off when not in use, and automatically wake up at a prescribed time prior to the next communications window. Provisions could be made to allow the device to use power from a lantern battery as a backup.

There would need to be a procedure to ensure the time is properly synchronized with a time standard. This could be automatically performed every time the miner is outside the mine—much like how the clock on a cell phone, or personal computer, is synchronized automatically. Time could be synchronized by NIST radio station WWV or WWVB, as well as by GPS. Provisions could also be made to synchronize the clock with the start of communications from above ground, i.e., if the communications are set to start above ground at 2 minutes before the half hour, the personal electronics device could note the time and ask if the operator wanted to synchronize with the external clock.

All transducer signal data could be digitized and recorded. This would include trigger signals and "line" synchronization signals. The data could be processed on site, or the data could be sent to an off site laboratory for processing. For example, the Office of Mine Safety and Health at NIOSH could provide a central data processing facility to service the industry. The data could be sent via email attachments or other communications systems known in the art. The ERP, required to be on file with MSHA, could include the engineering study and maps showing the locations of the transducers to assist in processing the data. Results could be transmitted back to the site along with recommendations for ways to improve the S/N for the next communications window.

Turning to the down channel wherein information is communicated from above ground to below ground. The resources available at the transmitting end and the receiving end are asymmetric with the up channel, i.e., there are more resources available at the transmitting end, and fewer resources at the receiving end. The asymmetry in resources between the up channel and the down channel allows a modification for the down channel.

The most immediate difference is the availability of much better vibrational generating equipment—both in power and repeatability. For example, a vibrator (such as pneumatic shakers used to unload hopper railcars), pile driver, jack hammer, low frequency pipe organ or resonant cavity (such as a steam whistle with one end buried in the earth), explosion, or other such device could be used to generate powerful seismic vibrations in a precise time sequence.

In one embodiment, steel pilings could be driven, as part of the basic mine infrastructure, at select locations around a mine site, as determined by an engineering study. In an emergency, a railcar shaker could be quickly attached to a bracket on the piling for the down channel and controlled by a portable computer with a solenoid valve in the air line, or even manually by a hand operated valve, based on timing signals to an operator. An air receiver would need to be charged prior to the communications window in order to switch the compressor off during the communications window. A signal transducer would also be attached to the piling, and additional pilings, for the up channel communications.

In another embodiment, hydraulic pressure could be applied directly to a vertical water flooded well, or preferably a horizontal drilled cavity, to maximize the P-wave, i.e., borrowing from fracking technology and U.S. Pat. No. 3,273,112, described hereinabove. By pulsing the water pressure, pressure would be applied to a larger layer of rock, which would make the layer act as a large piston. Moreover, if the pressure is exerted in a deep layer, a larger fraction of the movement will be in the downward direction due to the heavier load above, i.e., it would be a better impedance match—although most of the movement would still be upward, due to the lighter load. A series of wells could be constructed as part of the basic mine infrastructure. Pressure sensors could also be used to detect vibrations from the up channel. Note that pressure sensors, some of which are based on MEMS strain gages, operate down to 0 Hz.

In one embodiment, the hydraulic pulse could be generated by connecting the flooded well in a "tee" configuration, where water is pumped in a circular configuration through the tee. By rapidly closing a valve on the downstream side of the tee, a large hammer knock will be generated.

In some cases, existing underground pipes could be exploited as seismic wave generators by borrowing from seismic underground utility location technology, such as the techniques disclosed in U.S. Pat. No. 8,116,994 to Parker, which is incorporated by reference. Sound waves are injected into a pipe and swept in frequency in order to pass through resonance frequencies, which will cause the earth to vibrate, i.e., like a pipe organ.

The COMBIPHON® pipe detection system, available from Hermann Sewerin GmbH, Gütersloh, Germany, produces pulses in water lines by attaching a "Knocker" to an outlet. As the product literature, incorporated by reference herein, explains, The Knocker opens and closes a valve about every 2 seconds, releasing water to produce a steady stream of pulses in the pipe. The pulses produce vibrations in the ground which are detected with a sensor probe. Water lines could also possibly be used to detect up channel signals by using a pressure gage as a transducer.

In the case of a mine, an existing water line, or drainage pipe, could possibly be used for generating seismic waves in the ground. This would be part of the engineering study.

A message could be programmed and coordinated, much like a fireworks show. Moreover, an array of vibrational generators may be synchronized in an array to direct a vibrational beam in a particular direction, much like synthetic aperture radar. Similar to the predetermined window described for the up channel, the down channel could be pre scheduled to take place at least 30 minutes after an accident and commence for a 2 minute window, 2 minutes before the half hour, i.e. preceding the up channel communication window. For example, if the accident occurred at 8:15, the miners would know to expect to receive instructions at 8:58-9:00, 9:28-9:30, 9:58-10:00, etc.

The most elementary signals could probably be detected by direct sensory means such as by listening for sounds, or feeling vibrations. Simple detectors could be constructed by watching for vibrations in a cup of water or watching for a weight suspended from the ceiling by a shoe lace to swing in sympathetic vibrations. The bandwidth of such communications would be limited somewhat, but it would be a quantum improvement over no communications!

Figure 6:
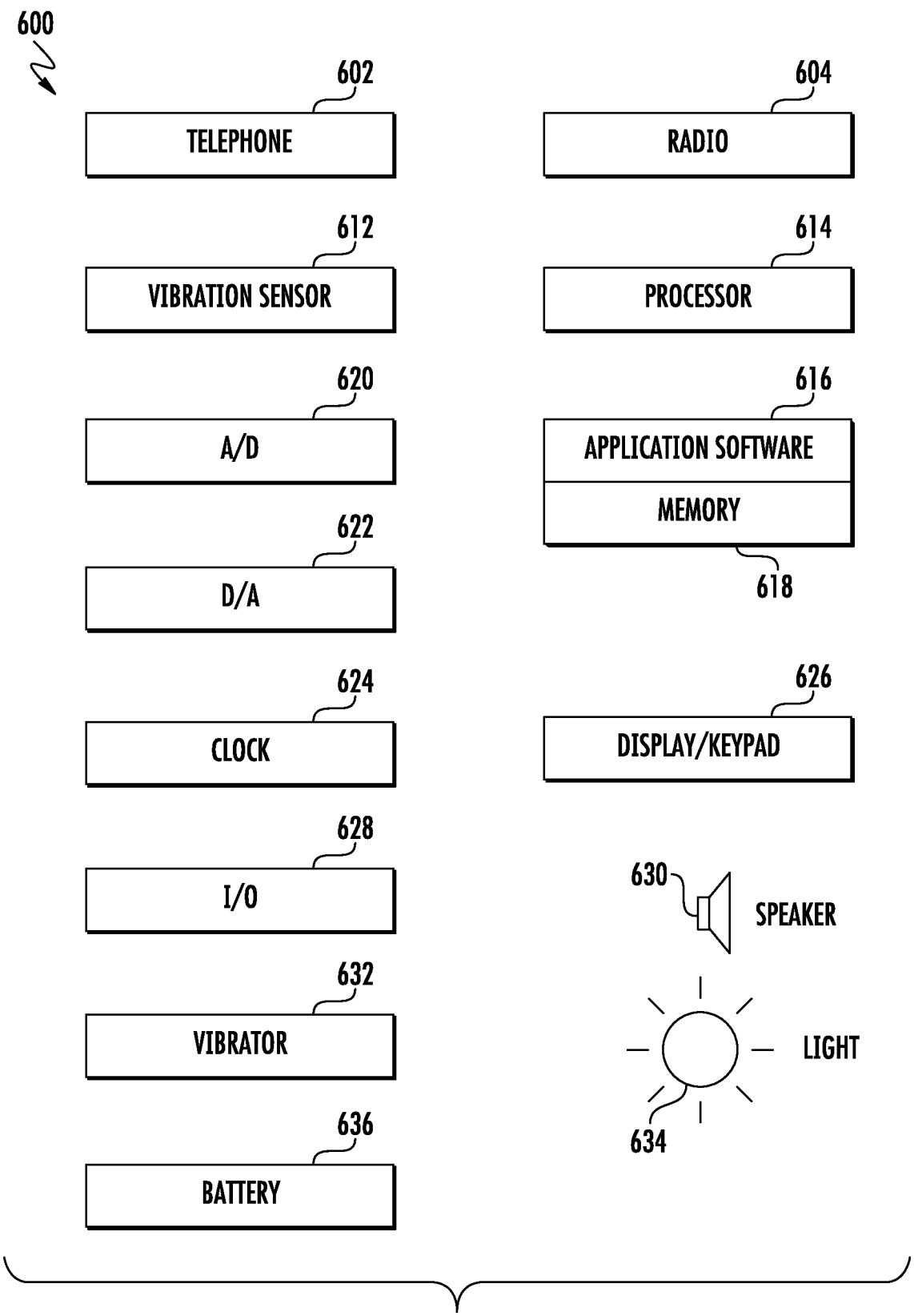
FIG. 6 shows a personal electronic device.

Modern handheld devices 600, as shown in FIG. 6, such as cell phones 602, and radios 604, are now being equipped with sensors 612, powerful processors 614, large memory capacity for computer instructions and data storage 616, 618, A/D and D/A 620,622, a clock 624, a display/keypad 626, I/O ports 628, speakers or earphones 630, vibrators 632, lights 634, and custom application software. For example, it is common for cell phones to include Micro-Electro-Mechanical System (MEMS) accelerometers 612 and sophisticated signal processing capabilities. They can operate for extended periods of time on a battery 636. For example, U.S. Pat. No. 8,351,979 to Seguin et al., U.S. Pat. No. 8,442,797 to Kim et al., U.S. Pat. No. 8,326,569 to Lee et al., all three of which are incorporated by reference herein, disclose cellular phones with accelerometers and software configured to detect tapping on the phone as instructions for the phone operations. Such devices could be modified to receive seismic signals such as Morse code.

Under Title 30 of the Code of Federal Regulations (30 CFR), electrical and electronic equipment used in underground mines must be approved by MSHA, and identified as "permissible" by MSHA. Such equipment may be explosion proof (XP), or intrinsically safe (IS). Telephones and signaling devices are under part 23, i.e., 30 CFR 23. Due to the design of handheld personal electronic devices, they must be IS. Detailed specifications are in document ACRI2001, *Criteria for the Evaluation and Test of Intrinsically Safe Apparatus and Associated Apparatus*. In addition to leaky feeder radios, MSHA permissible handheld computers and cell phones are now commercially available from companies such as: Snively Inc., Mentor, Ohio; and Ecom Instruments, a division of Pepperl+Fuchs North America, Twinsburg, Ohio.

It would be reasonable to provide every underground coal miner with a handheld personal electronic device 600 that could sense vibrations and decode the vibrations into text messages. The sensor 612 could be mechanically incorporated into the housing of the device, or it could be a separate accessory that is in communications with the device via a cable or wireless communication. There could also be a plurality of accessory sensors that could be distributed in an array for additional S/N reduction and directional analysis.

Knowing that the seismic vibrations of interest will be relatively low frequency, the sensor output could be low pass filtered—analog or digital—before subjecting it to correlation operations. This would greatly reduce the computing overhead.

In addition to decoding the down channel vibrations into the message via digital signal processing, the device could digitize 620 and record the sensor 612 input for the duration of each window. At the conclusion of the recording window, the miner could then replay the signal back as an D/A 622 converted aural signal at variable playback speeds, as described in USGS Open-File Report 2009-1095, which was described hereinabove. The miner could vary the playback speed, start and stop, as well as, go forward and backward in order to zoom in on signals that are aurally detectable.

It would be desirable to play back each communications window and/or repetition period in a continuous loop, while adjusting the playback speed in order to search for messages aurally. It would also be desirable to single step, forward and backward, through each repetition period. The waveform may also be displayed. The repetition period could be marked, as a reference, by flashing a light 626, 634 or pulsing a vibrator 632, in sync with the repetition period, at the playback speed in order to set the cadence, or beat. The time of day of the recording could also be displayed in sync with the playback. The device 600 may include earphones 630 to enhance aural sensitivity. The aurally detected signals could then be entered into the device 600 for decoding via the keypad 626. It would also be desirable to play back the cross-correlation data as sound, while displaying the corresponding lag times. The sharp spikes in the cross-correlation may be easier to detect aurally.

While fully automated signal detection/decoding is preferable, there would be a sense of satisfaction in actually hearing the vibrations—particularly if the digital signal processing algorithms fail to recognize a message, i.e., the miner could double check to see if he agrees that there was no message. He could also possibly identify a segment to be used for the kernel to be used by the digital signal processing software, i.e., give the software a hand.

The same device could incorporate the timing functions for the up channel as described hereinabove. Such a device could be incorporated into a self-rescuer respirator package, hardhat, light, leaky feeder radio unit, or other equipment which is carried by every miner. Since any one of the devices could independently perform the functions, there would be inherent redundancy in the system, based on the fact that most accidents result in groups instead of individual survivors.

In order to detect low amplitude vibrations, the sensor 612, or sensors, would be placed in contact with the mine wall, floor, or ceiling. Information Circular 8567, described hereinabove, teaches that attachment to the mine ceiling is preferable, i.e., 8 dB stronger than the mine floor.

The sensor will most likely be directional, so it would be important to properly orient the sensor for maximum sensitivity. In one embodiment, the sensor could be suspended by a wire, or high tensile strength fiber (such as fishing line), from a roof bolt. The sensor attachment point would be optimized to couple P-wave vibrations to the sensor.

In another embodiment, an anchor, or bracket, could be glued with a high strength material—such as epoxy—to the roof. In still another embodiment, the sensor could be pressed directly against the roof and held in direct contact by an elastic band or compliant material—such as foam. In yet another embodiment, the sensor could include a threaded attachment to fit a roof bolt. Direct contact with the miner's hand should be avoided in order to avoid spurious signals, such as heartbeats and breathing.

In a typical scenario, a clock 624 in the device 600 could alert the miner at 8:56 that a communications window is to begin at 8:58. The miner would place the device in contact with the mine ceiling and wait for a message. All miners would stop talking or moving—or move away from the device, if conditions permit. Starting at 8:58, a series of modulated vibrations would be generated above ground which would be received and decoded by the device. A text message would be displayed and recorded which could give the miners status information and detailed instructions.

In one embodiment, the device would include I/O provisions 628 to exchange information with other such devices in proximity. This could be via radio transmissions, line of sight optical communication, near-field communication, wired connections, or any other method known in the art. For a group of miners, each miner could simultaneously detect the signals from various locations in the mine, i.e., form an array of receivers. The data could be combined in a master device for error detection and digital signal processing, e.g., stacking the signals or correlating combinations of signals. The best and worst signals could be identified and changes made in the placements for the next communications window. By knowing the geometry of the array, the direction to the source could be determined. For example, the exact location to drill a shaft could be confirmed by placing the devices in a pattern centered on the desired shaft location and finding a trial source location that arrives at the same time, i.e., finding the trial location where the source is directly overhead.

The ERP could include provisions for communications between two or more groups of miners that are separated. For example, they could communicate between the groups at second times, such as on 15 and 45 minutes after the hour. This would assist them to regroup, if there is an un obstructed path, or at least relay information from one group to another.

The instructions could include modifications to the standard operation procedures, or ask simple yes/no questions. By default, from 9:00 to 9:02, the miners would respond to the questions or signal that they are alive, indicate their location, etc. If there was a question as to how many groups of miners there are, the down channel could instruct members of certain groups to respond in a certain order. For example, a prompt could be sent to the group with the highest seniority missing miner to respond first and proceed down the list by seniority number (much like a roll call) until a response is received. The procedure could also go by level in the mine, north to south, east to west, etc.

For example, if employee numbers 78, 157, 215, and 412 were missing, the message "E78" could be sent via the down channel. If employee 78 could respond, he/she would respond by hammer strikes on 10 second intervals starting on the next minute mark. If a response is detected, the message "*" could be sent to acknowledge detection. The procedure would them be repeated to find employee 157, etc. After initial communications are established, a series of questions could be sent to establish which employees are in particular groups, and the group locations. A plurality of windows may be established—one for each group. For example, group one may signal from 9:00-9:02, and another from 9:02-9:04, etc. The details could be handled in the training.

Figure 3:
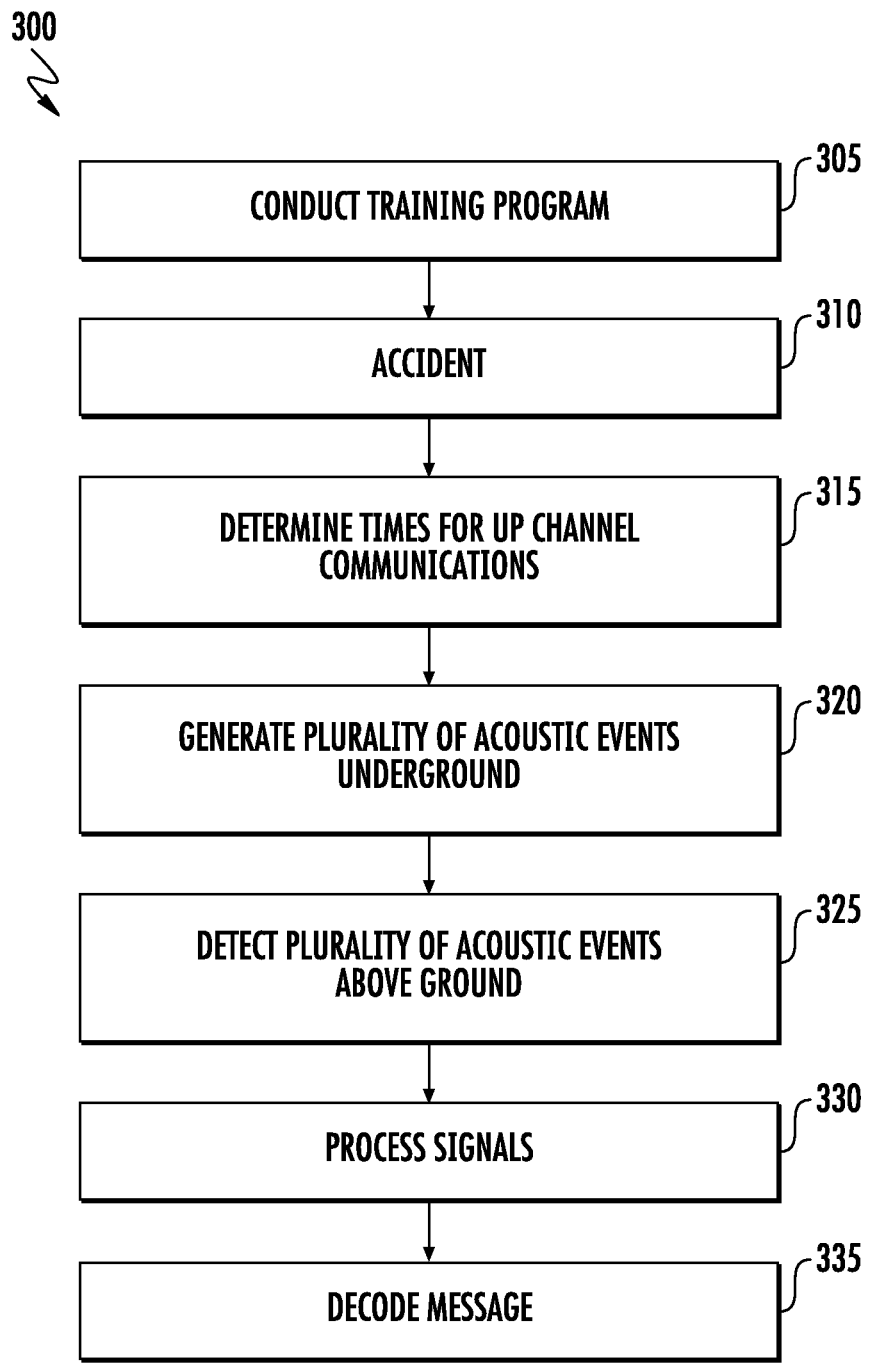
FIG. 3 shows steps for up channel communications.

An example up channel communications system 300 may be implemented into an ERP as shown in FIG. 3. A training program 305 is conducted for all underground and rescue personnel. The training would include such topics as determining the communications windows following an accident. This determination must be made independently by the underground and rescue personnel, based on the approximate time of the accident. The length of the communication window and data encoding scheme must be clearly established as part of the ERP.

Following an accident 310 each party would independently determine the actual up channel communication window times 315. At the prescribed times, the underground personnel would generate a plurality of acoustic events 320 in accordance with the training program 305. The rescue personnel would prepare the above ground equipment and record the plurality of acoustic events 325. The rescue personnel would process the recorded signals 330 and decode the message 335 in accordance with the data encoding scheme in the training program 305.

Figure 4:
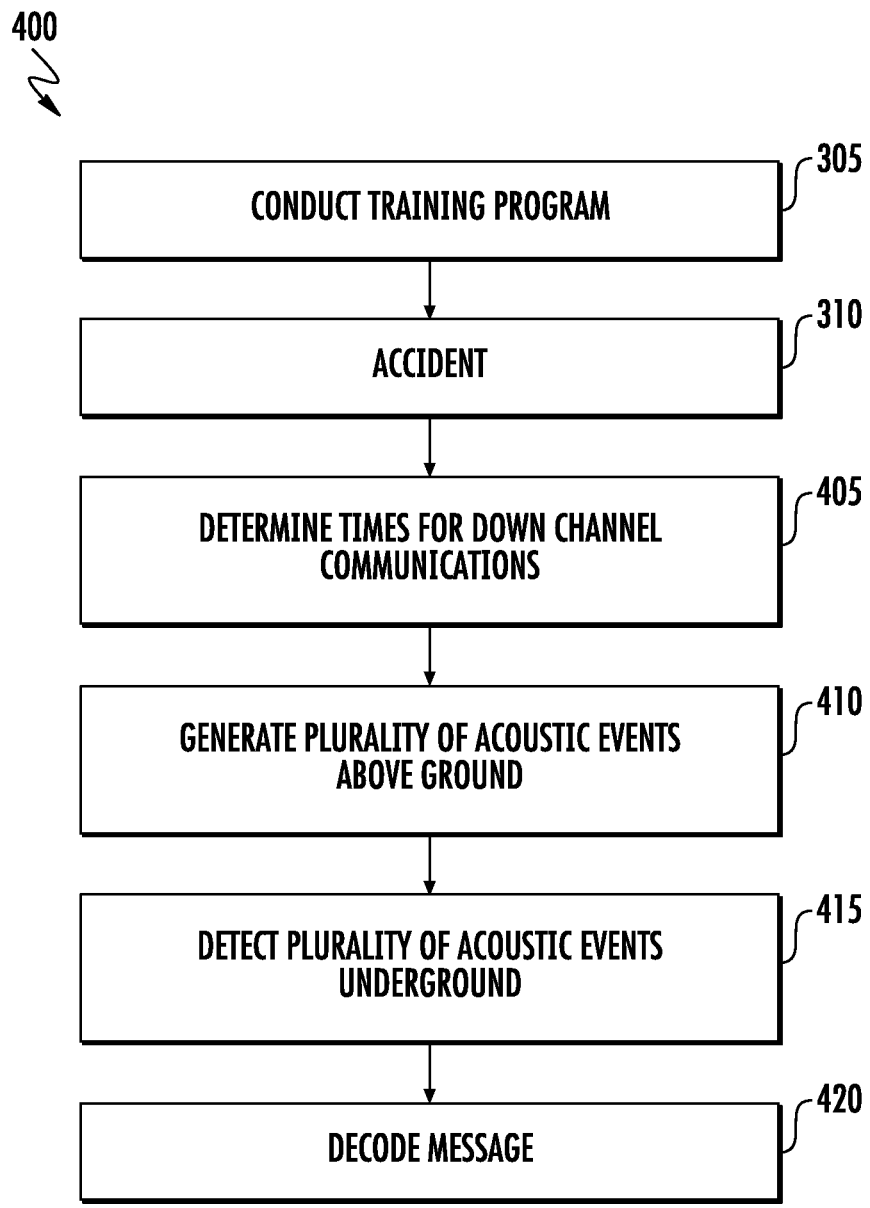
FIG. 4 shows steps for down channel communications.

An example down channel communications system 400 may be implemented into an ERP as shown in FIG. 4. The same training program 305 is conducted for all underground and rescue personnel. Following an accident 310 each party would independently determine the actual down channel communication window times 405. At the prescribed times, the above ground personnel would generate a plurality of acoustic events 410 in accordance with the training program 305. The underground personnel would prepare to detect the plurality of acoustic events 415 and decode 420 the message in accordance with the data encoding scheme in the training program 305.

It will be understood that example times are merely to illustrate the spirit of the invention. Moreover, once initial communications are firmly established, the procedures may be modified to fit the circumstances. For example, it may be more important to continue drilling than to shut down operations for communications every half hour. A signal could be transmitted via the down channel that the next scheduled communication is to take place at 14:58:00 instead of the next default window. This would be acknowledged via the up channel, and the miners could rest until the appointed time. Of course the complexity of the modifications would depend on the miners having personal electronic devices to decode higher bandwidth signals. In the absence of such devices, the training program would need to cover contingency plans for modifying the default procedures.

Figure 5:
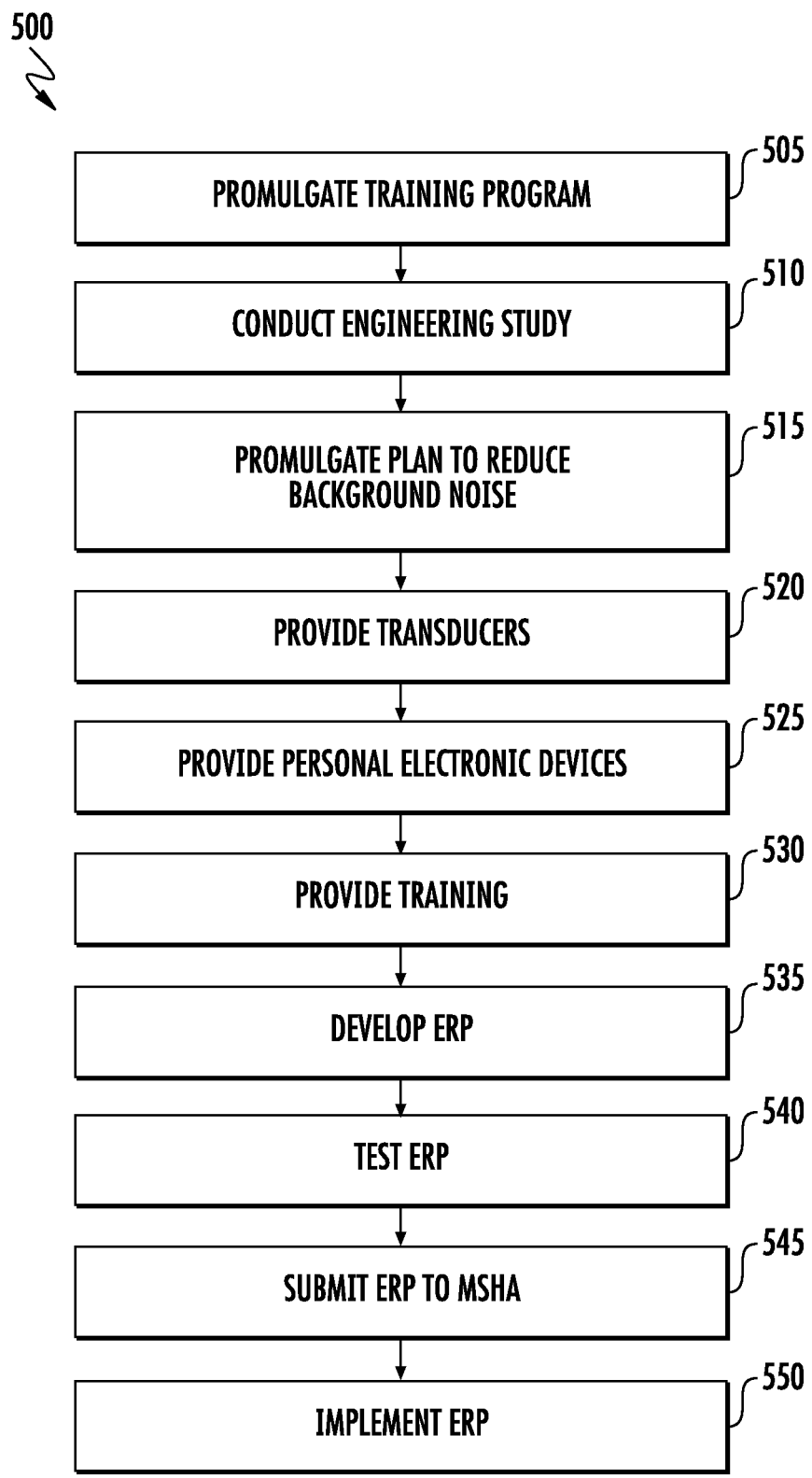
FIG. 5 shows steps for an Emergence Response Plan in compliance with Mine Safety and Health Administration regulations.

An example plan for compliance with post-accident two-way communications requirements 500 may be implemented as shown in FIG. 5. A training program would be developed 505 for review. This would include input from and review by management, labor, engineering, local emergency personnel, and government agencies. An engineering study of the mine site and equipment would be conducted 510. This would include such things as accurate maps of the mine that tie into bench marks above ground and GPS coordinates, determining maximum distances to every portion of the mine and optimum locations for transducers and signal generators such that a reasonable energy impact can be reliably detected within a communication window. A plan would be developed to reduce background noise during a communications window 515. This would include determining which equipment could be switched off and means for minimizing vibrations during communications windows for equipment that can not be safely switched off. Transducers would be provided 520 in accordance with the engineering study 510. Personnel would be provided with personal electronic devices to detect vibrations, encode signals, and decode signals 525. A training program would be conducted for all personnel 530. The formal Emergence Response Plan would be written 535 and tested 540. The ERP would be submitted to the MSHA 545 and implemented 550.

Having disclosed the invention and example embodiments of the method in sufficient detail, other applications and embodiments customized to the specific requirements of particular mines or circumstances embracing the spirit and scope of the method will become apparent to those skilled in the art.

What is claimed is:

1. A personal electronics device that receives and decodes acoustic communication signals transmitted through earth as mechanical vibrations of the earth in presence of noise, starting at a first time of day and in accordance with an emergency response plan for an underground mine so as to coordinate with rescue personnel and extract the acoustic communication signals from the noise, the personal electronics device comprising:
    a clock that is automatically synchronized with a time standard, wherein;
        the clock sets a first differential time period, which is a repetition period, and a second differential time period, which is a communications window;
        the first time of day is determined by the personal electronics device in accordance with the emergency response plan and synchronized with the time standard;
        start of the communications window is based at least in part on the determined first time of day; and
        the second differential time period spans a plurality of the first differential time periods;
    a vibration sensor that is responsive to the acoustic communications signals and the noise, when placed in contact with the earth, to produce electrical signals which are digitally recorded at a first speed during the communications window;
    an application software package, which when executed by the personal electronics device, reduces the noise and decodes the digitally recorded electrical signals to produce a decoded text message that was transmitted through-the-earth as the mechanical vibrations of the earth, wherein the noise reduction and decoding is based at least in part on the digitally recorded electrical signals for the plurality of repetition periods, the determined first time of day, the repetition period, and correlation between the digitally recorded electrical signals for at least two of the plurality of repetition periods;
    a first interface that communicates to a person the decoded text message;
    wherein the application software package plays back the digitally recorded electrical signals as first audible sound at a second speed; and
    wherein the second speed is selectable by the person to be different from the first speed.

2. The personal electronics device of claim 1, wherein the application software package produces a visual signal synchronized to the repetition period at the second speed.

3. The personal electronics device of claim 1, wherein the first audible sound is produced by an earphone.

4. The personal electronics device of claim 1, wherein the application software package plays back as second audible sound the digitally recorded electrical signals for a first communications window in a continuous loop.

5. The personal electronics device of claim 1, wherein the application software package plays back as second audible sound the digitally recorded electrical signals for a first repetition period in a continuous loop.

6. The personal electronics device of claim 5, wherein the application software package plays back as third audible sound the digitally recorded electrical signals for a second repetition period in a continuous loop, wherein the second repetition period is selectable by the person.

7. The personal electronics device of claim 1, wherein the application software package plays back as second audible sound the correlation between the digitally recorded electrical signals for the at least two of the plurality of repetition periods.

8. The personal electronics device of claim 1, wherein the application software package includes a map of a mine.

9. The personal electronics device of claim 1, further comprising a second interface that exports the digitally recorded electrical signals.

10. The personal electronics device of claim 1, further comprising a third interface that imports first digital data.

11. The personal electronics device of claim 10, wherein the noise reduction and decoding is further based on the first digital data.

12. The personal electronics device of claim 1, wherein the noise reduction and decoding is further based on a model of the acoustic communication signals that produce the electrical signals having a ringing signature with a decaying exponential amplitude envelope and having a duration shorter than the repetition period.

13. The personal electronics device of claim 1, wherein the noise reduction and decoding is further based on a model of the acoustic communication signals that produce the electrical signals being generated by a motor driven vibrator having a swept frequency and having a duration shorter than the repetition period.

14. The personal electronics device of claim 1, wherein the noise reduction and decoding is further based on a model of at least part of the noise being synchronous with a distribution power line frequency.

15. The personal electronics device of claim 1, wherein the correlation between the digitally recorded electrical signals for the at least two of the plurality of repetition periods is based on cross-correlation, and one of the at least two of the plurality of repetition periods is modeled as a counterpart signal.

16. The personal electronics device of claim 1, further comprising a radio transmitter or receiver configured to operate in the underground mine.

17. The personal electronics device of claim 1, further comprising a cell phone configured to operate in the underground mine.

18. The personal electronics device of claim 1, further comprising a self-rescuer respirator package, hardhat, light, or leaky feeder radio unit configured to operate in the underground mine.

19. The personal electronics device of claim 1, wherein the interface is a display, a speaker, or combinations thereof.

* * * * *